(12) United States Patent
Han

(10) Patent No.: US 10,947,956 B2
(45) Date of Patent: Mar. 16, 2021

(54) EXPANDABLE POWER MARINE HYDROKINETIC TURBINES, PUMPS, COMPRESSORS AND TRANSMISSIONS

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 16/233,365

(22) Filed: Dec. 27, 2018

(65) Prior Publication Data

US 2020/0088156 A1     Mar. 19, 2020

Related U.S. Application Data

(63) Continuation-in-part of application No. 16/134,595, filed on Sep. 18, 2018.

(51) Int. Cl.

| F03D 9/25 | (2016.01) |
|---|---|
| F03D 13/20 | (2016.01) |
| F03D 15/10 | (2016.01) |
| F03B 7/00 | (2006.01) |
| F03B 13/26 | (2006.01) |
| F03B 15/12 | (2006.01) |
| F03D 3/04 | (2006.01) |

(Continued)

(52) U.S. Cl.
CPC ............... *F03D 9/25* (2016.05); *F03B 7/003* (2013.01); *F03B 13/264* (2013.01); *F03B 15/12* (2013.01); *F03D 3/0454* (2013.01); *F03D 3/0472* (2013.01); *F03D 13/20* (2016.05); *F03D 15/10* (2016.05); *F03B 11/02* (2013.01); *F03B 17/061* (2013.01); *F03B 17/063* (2013.01); *F03D 80/70* (2016.05); *F05B 2210/16* (2013.01); *F05B 2240/12* (2013.01); *F05B 2240/40* (2013.01); *F05B 2240/91* (2013.01); *F05B 2240/93* (2013.01); *F05B 2260/4031* (2013.01)

(58) Field of Classification Search
CPC .................................................. F05B 2260/404
USPC ........................................ 290/43, 44, 54, 55
See application file for complete search history.

(56) References Cited

U.S. PATENT DOCUMENTS

| 3,177,122 A * | 4/1965 | Leonard, Jr. ............. G21C 1/30 |
| | | 376/343 |
| 6,794,781 B2 * | 9/2004 | Razzell ................ H02K 49/102 |
| | | 310/114 |

(Continued)

*Primary Examiner* — Charles Reid, Jr.
(74) *Attorney, Agent, or Firm* — Cameron LLP

(57) ABSTRACT

A marine hydrokinetic electric power or wind power generator may have three modules: a harnessing module, a controlling module, and a generating module. The harnessing module may have one of a propeller and a waterwheel for receiving wind or water energy. The controlling module may have a gearbox comprising gears for matching the expected wind or water generating power to an output power, a control motor, and a three variable gear assembly. The three variables are a variable input, a constant output and a constant speed control motor input variable. The variable input is received from the harnessing module and the constant output is delivered to an electricity generator. A generating module (generator) generates output power which may be a multiple of ten times the power rating of the controlling module (the constant speed control motor).

12 Claims, 23 Drawing Sheets

Perspective View of a River Turbine

(51) Int. Cl.
*F03D 80/70* (2016.01)
*F03B 17/06* (2006.01)
*F03B 11/02* (2006.01)

(56) References Cited

U.S. PATENT DOCUMENTS

| | | | |
|---|---|---|---|
| 8,067,847 B1 * | 11/2011 | Waszak | H02P 9/007 |
| | | | 290/44 |
| 8,388,481 B2 | 3/2013 | Han | |
| 8,485,933 B2 | 7/2013 | Han | |
| 8,702,552 B2 | 4/2014 | Han | |
| 8,986,149 B2 | 3/2015 | Han | |
| 8,992,370 B2 | 3/2015 | Han | |
| 9,151,269 B2 | 10/2015 | Han | |
| 9,169,772 B2 | 10/2015 | Han | |
| 10,378,506 B2 * | 8/2019 | Han | F03B 3/18 |
| 2013/0320681 A1 * | 12/2013 | Karmaker | H02K 9/193 |
| | | | 290/55 |
| 2014/0284932 A1 * | 9/2014 | Sharkh | H02K 7/11 |
| | | | 290/54 |
| 2017/0030326 A1 * | 2/2017 | Han | F03B 15/08 |
| 2018/0038340 A1 * | 2/2018 | Han | F03D 7/0272 |
| 2020/0088159 A1 * | 3/2020 | Stoesser | H02K 49/102 |

* cited by examiner

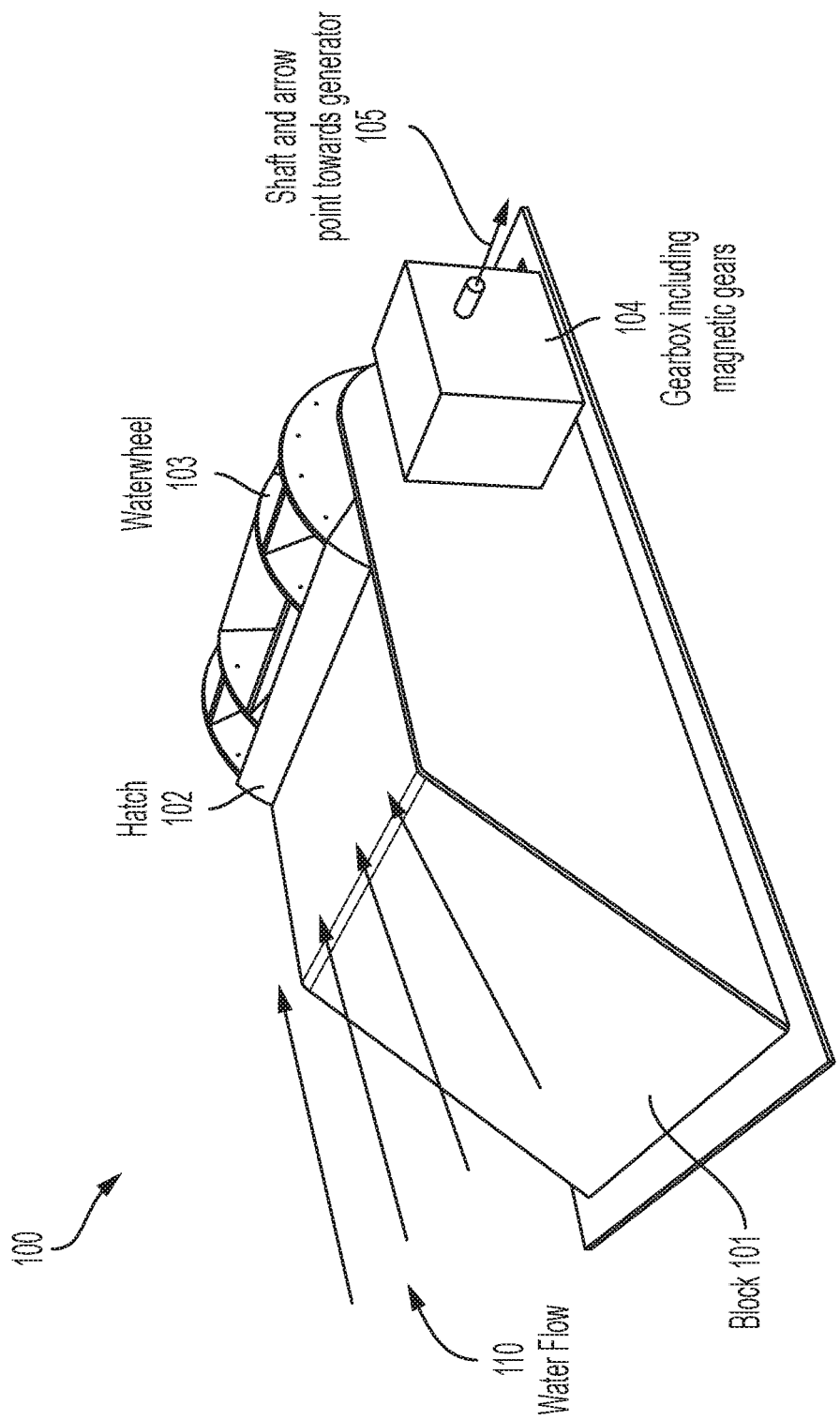
Figure 1. Perspective View of a River Turbine

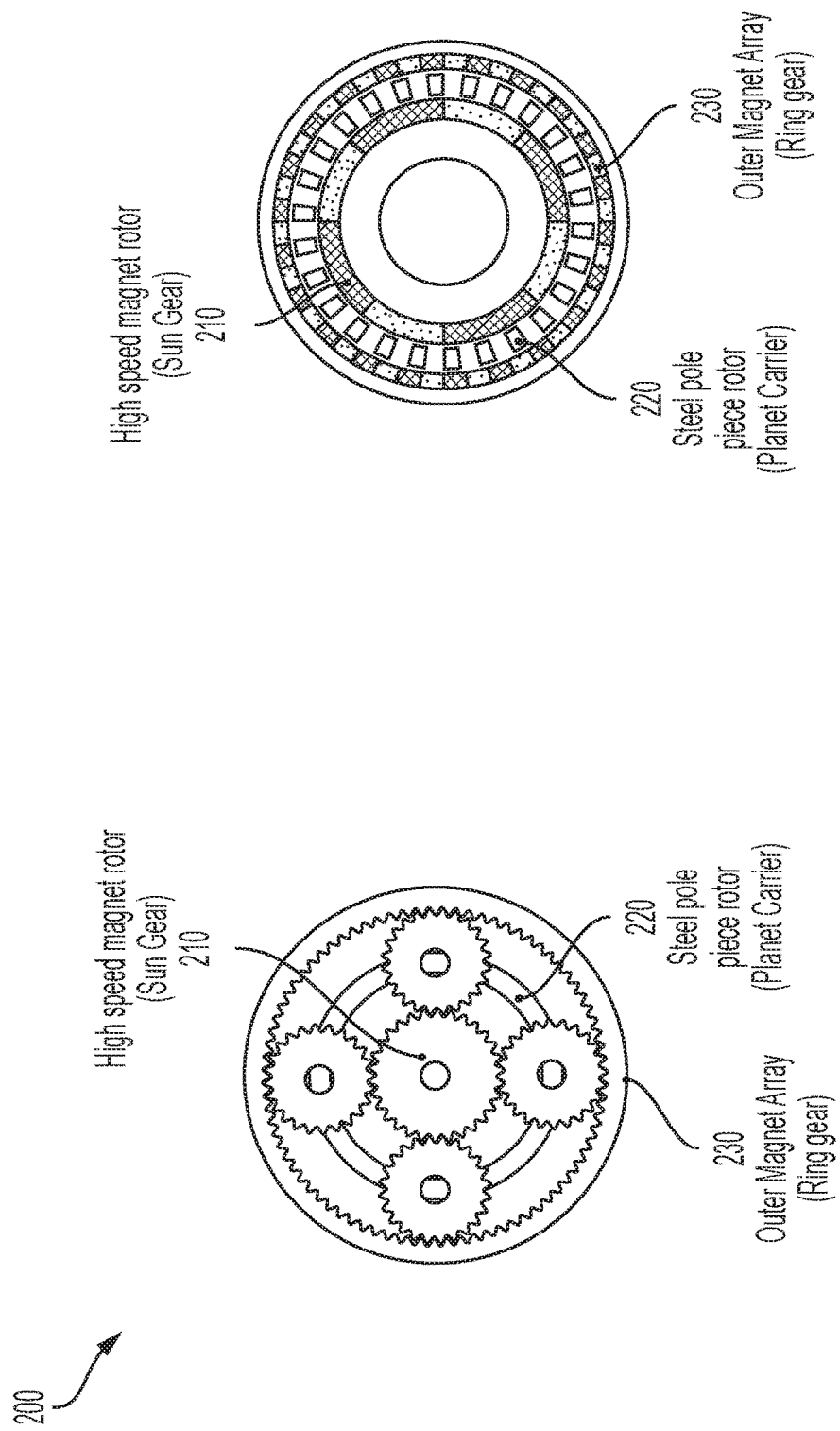

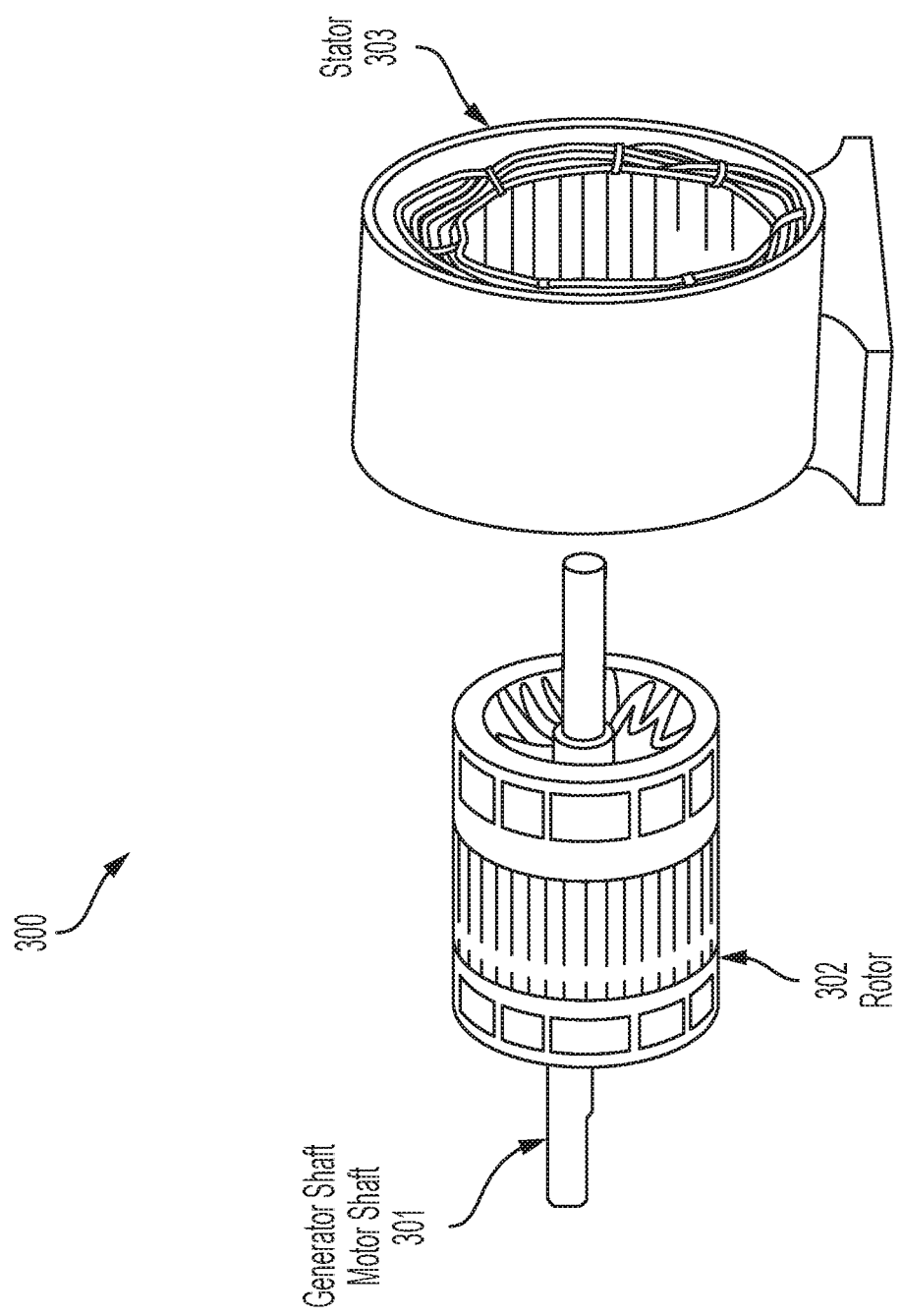
Figure 3. Variable Overlap Generator

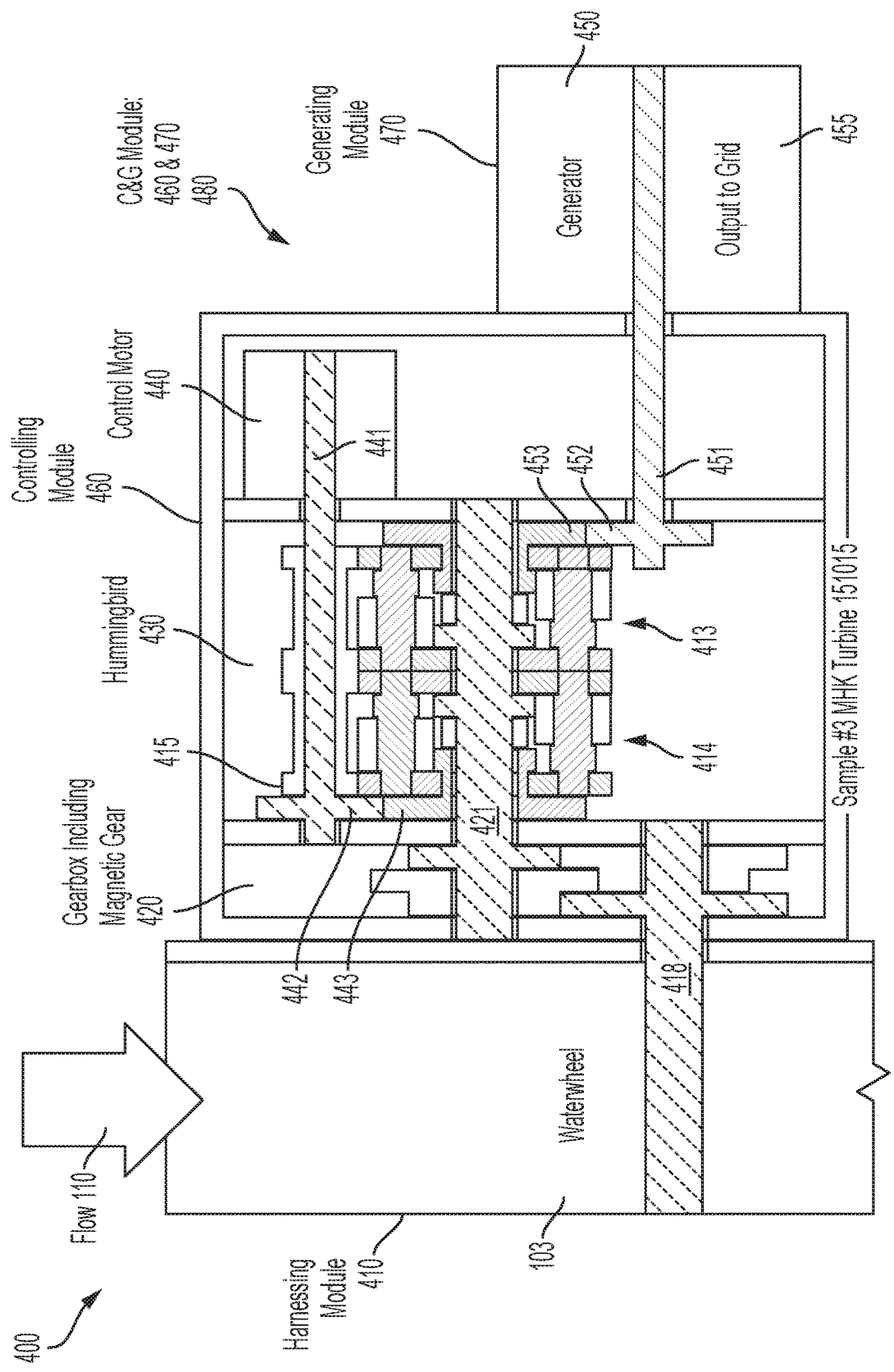
Figure 4. General Layout of a River Turbine

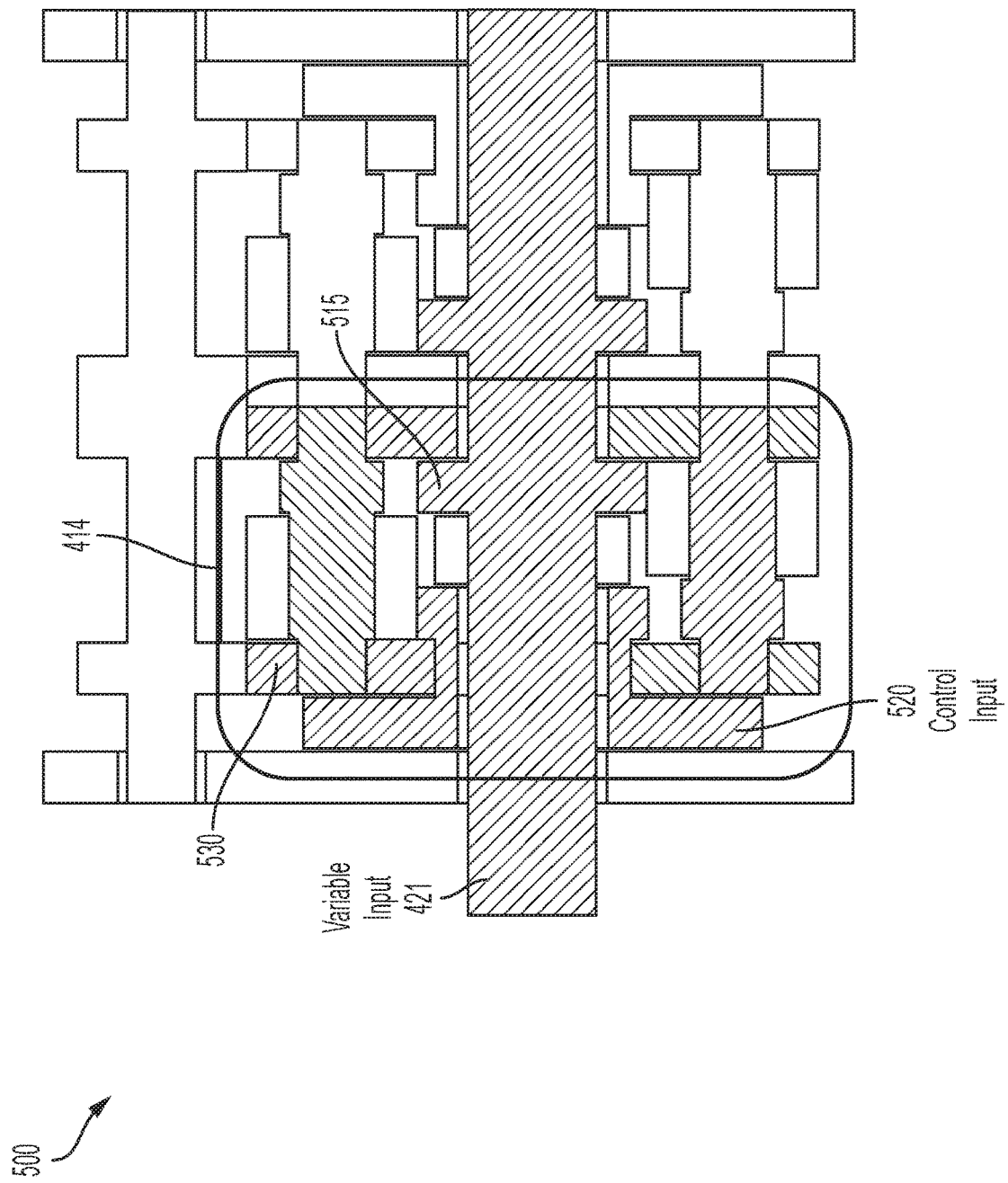
Figure 5. Left Transgear of Hummingbird

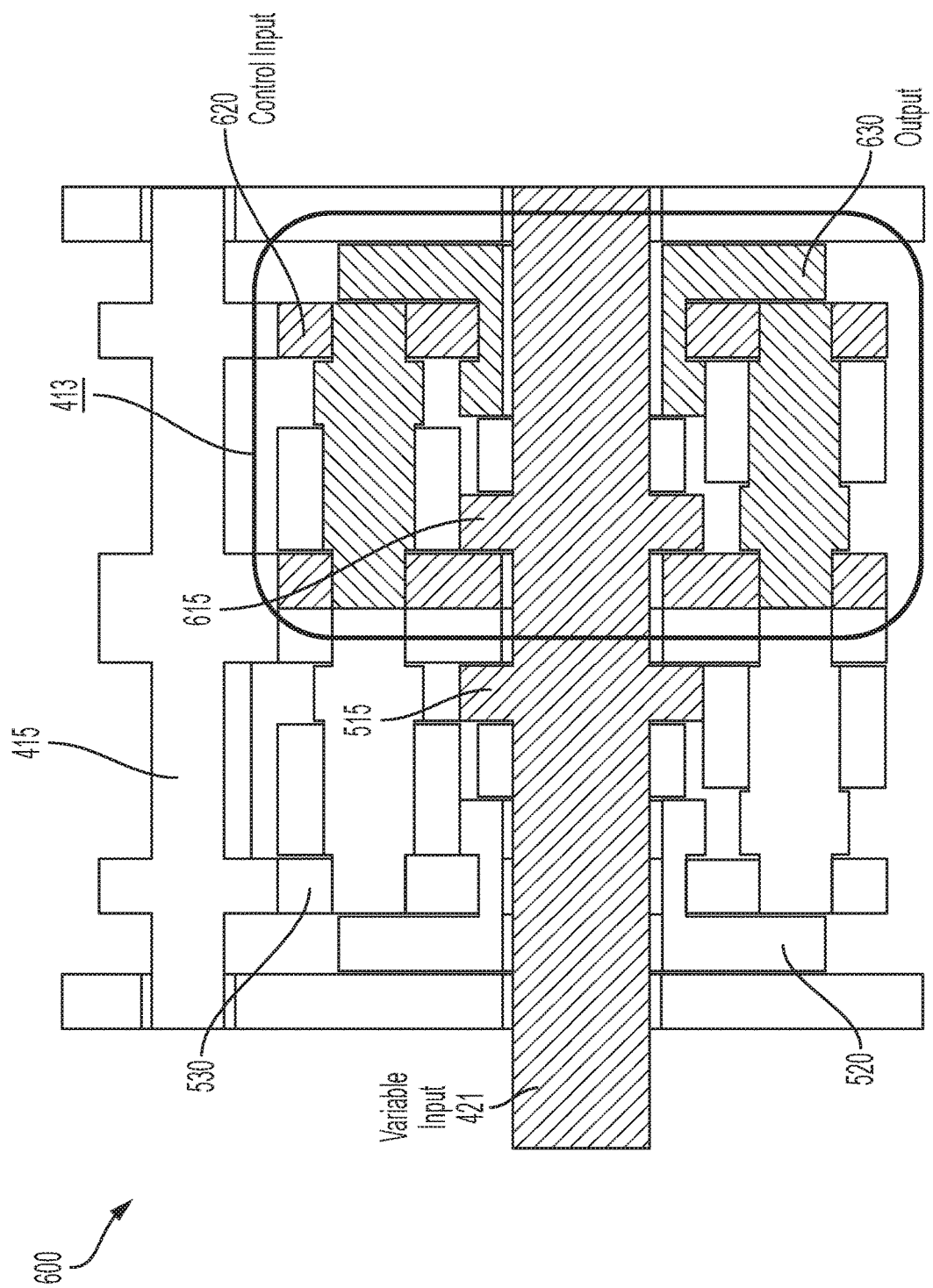
Figure 6. Right Transgear of Hummingbird

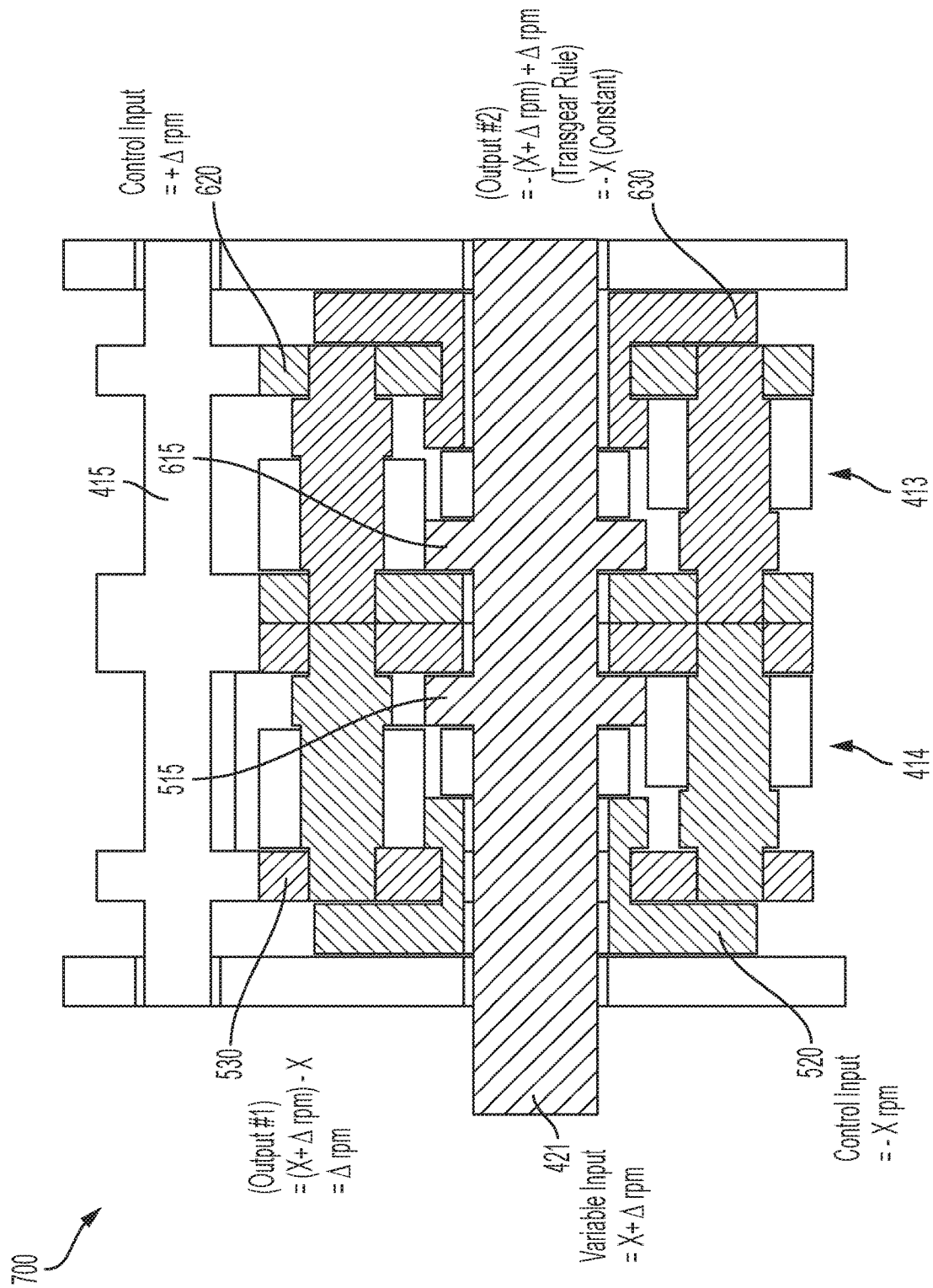
Figure 7. Hummingbird: Input, Control, and Output

2 Transgears with Con-gear

Carrier Brackets attached

Pins elongated

Left Planetary Gears rotated

Middle Sun Gear Diameter enlarged

L&R Sun Gears pushed in

Figure 8. Hummingbird Simplification

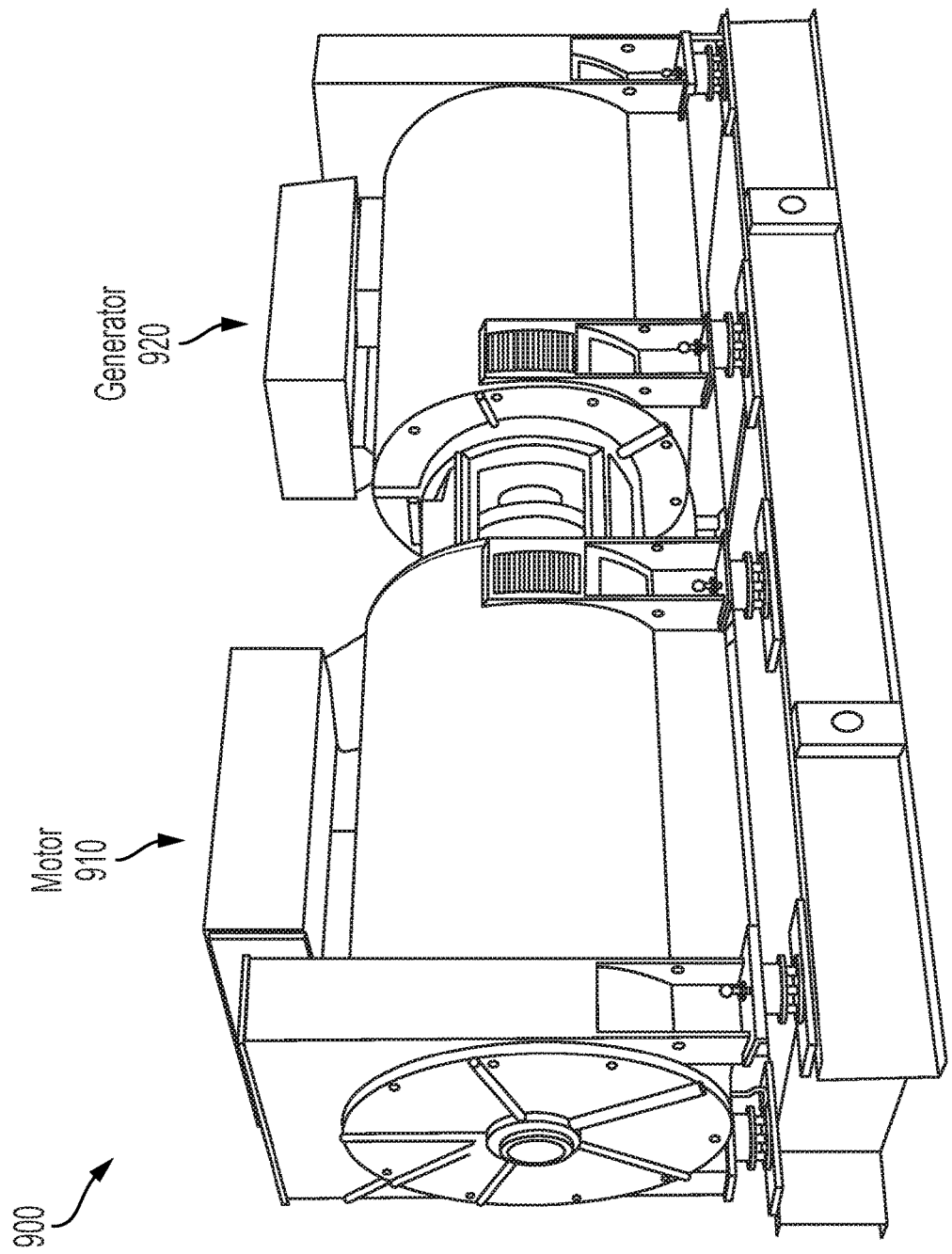
Figure 9. Rotary Frequency Converter
PRIOR ART

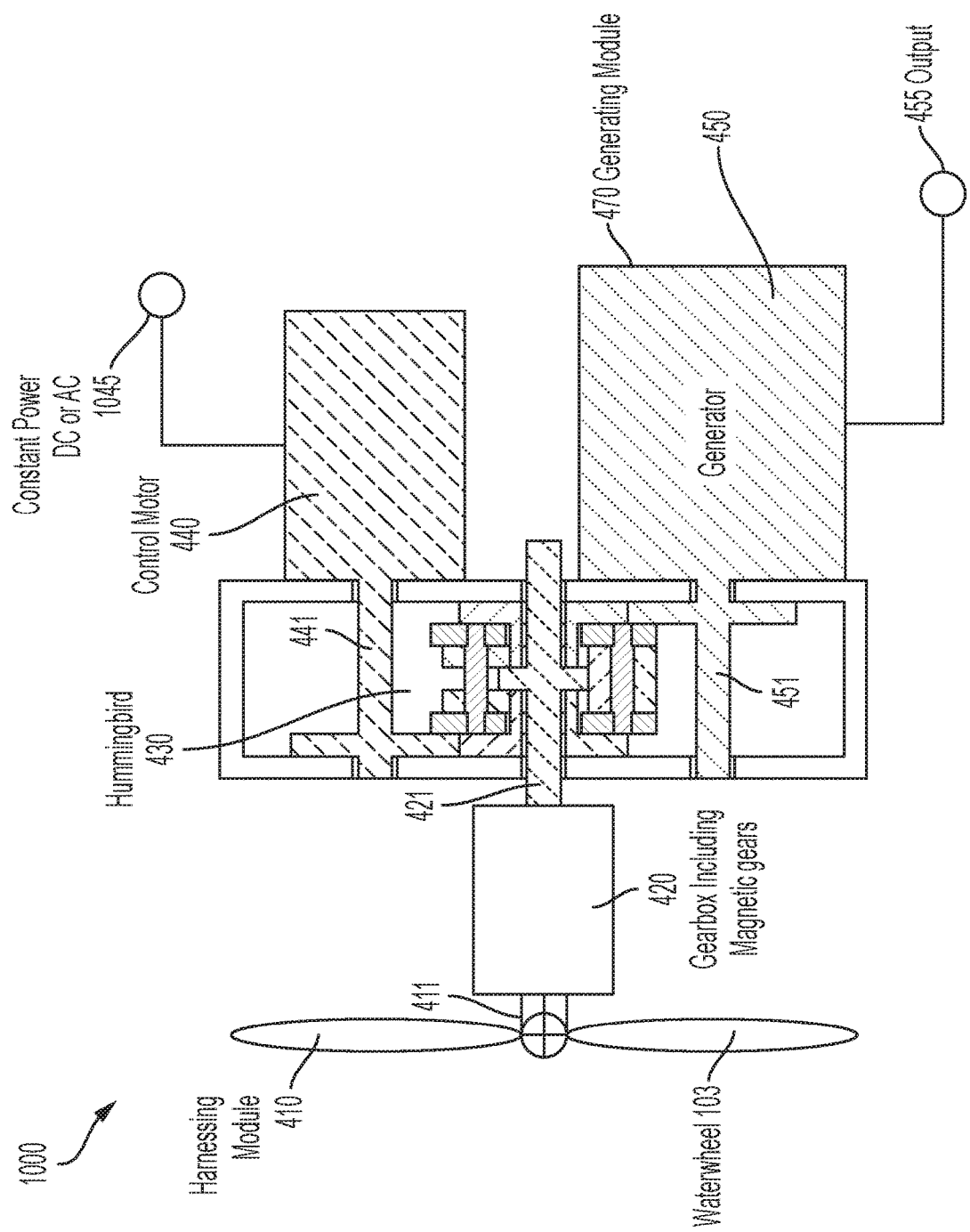
Figure 10. River turbine with a simplified Hummingbird.

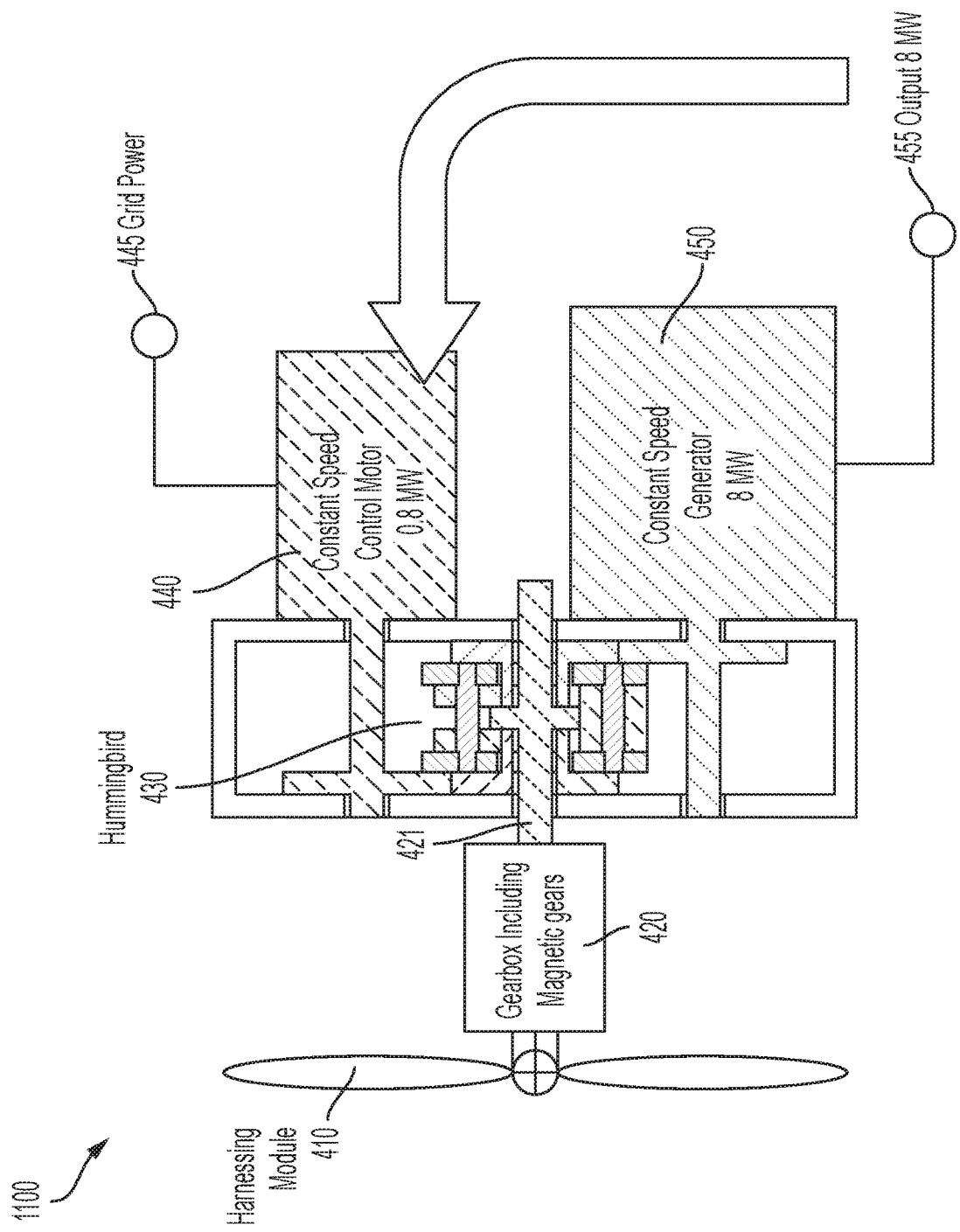
Figure 11. Power Multiplying Example: Output power 8 MW is pre-determined.

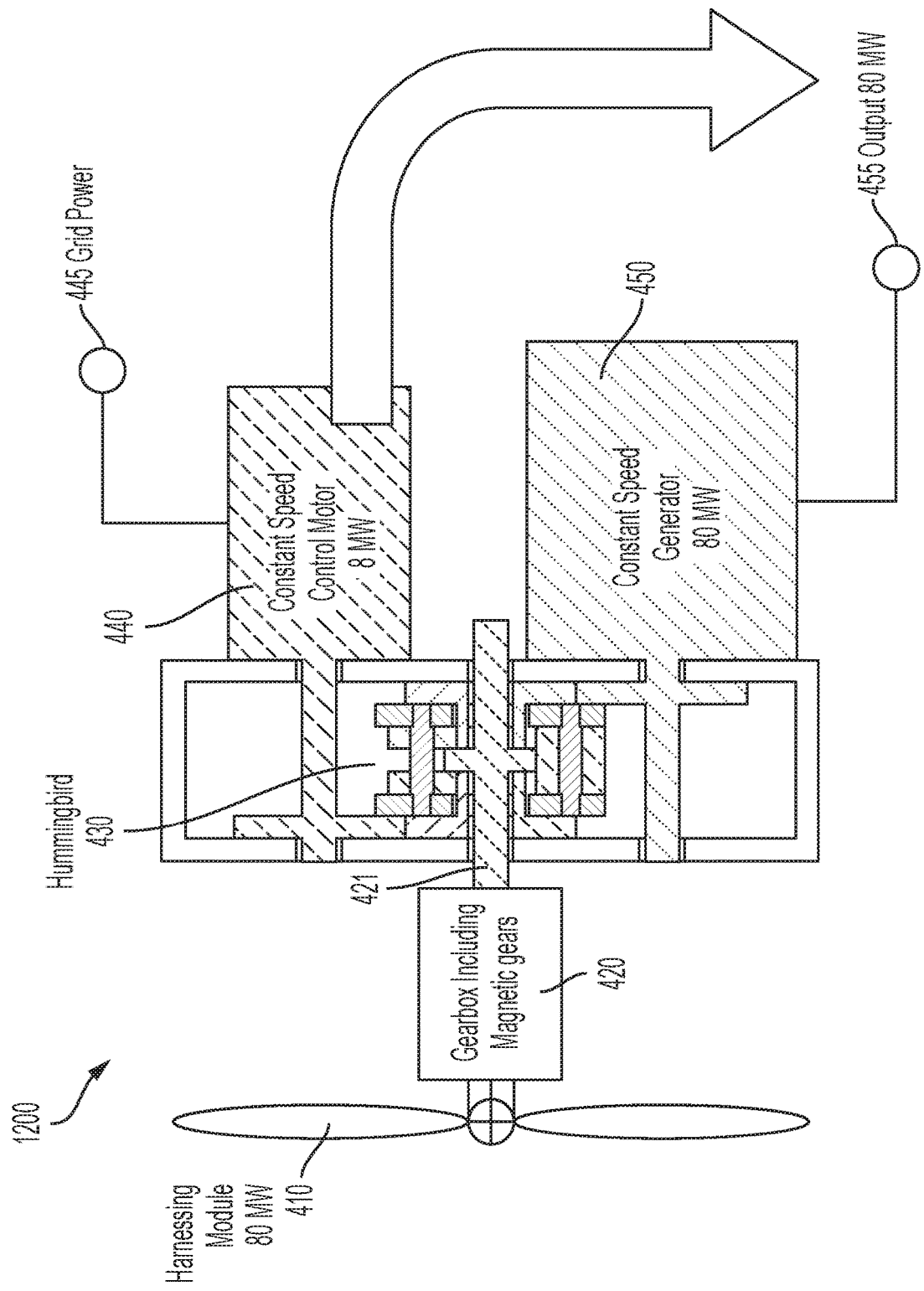
Figure 12. Power Multiplying Example: Control power 8 MW is pre-determined.

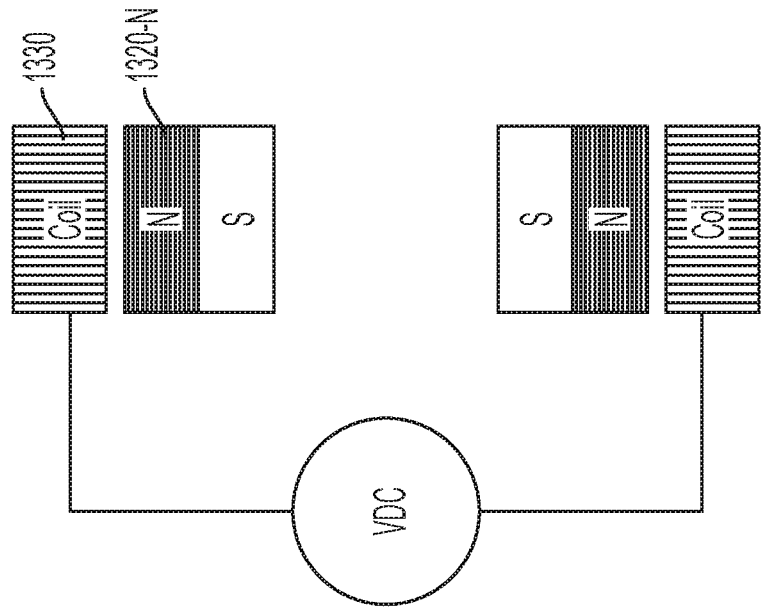
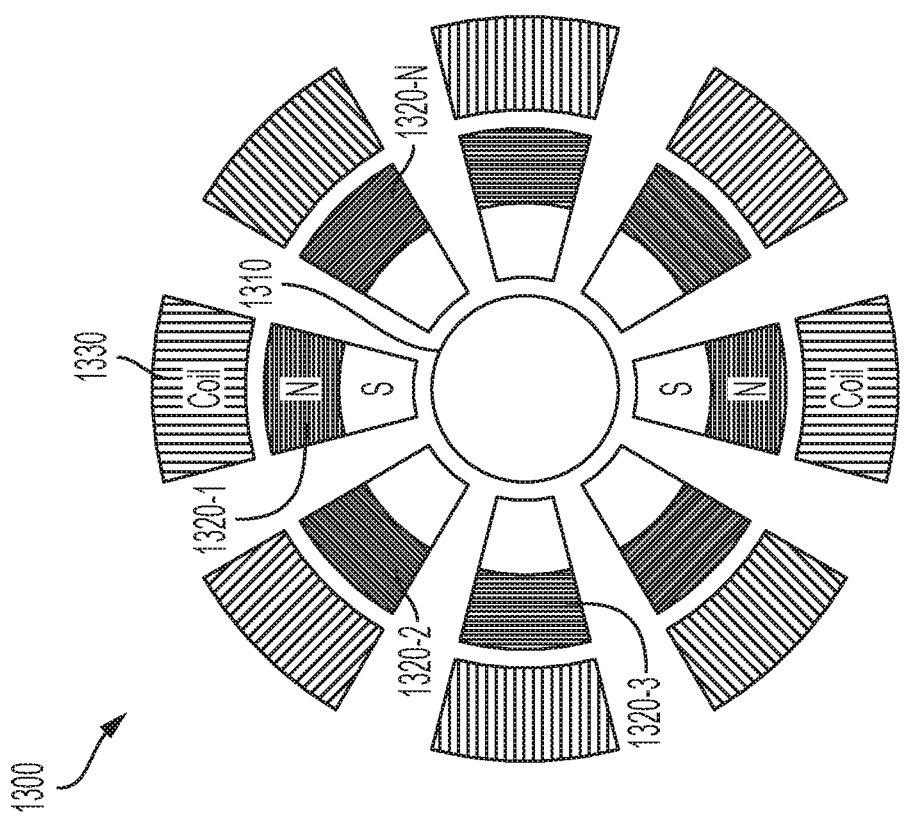
Figure 13(B) Side View
Figure 13(A) Top View

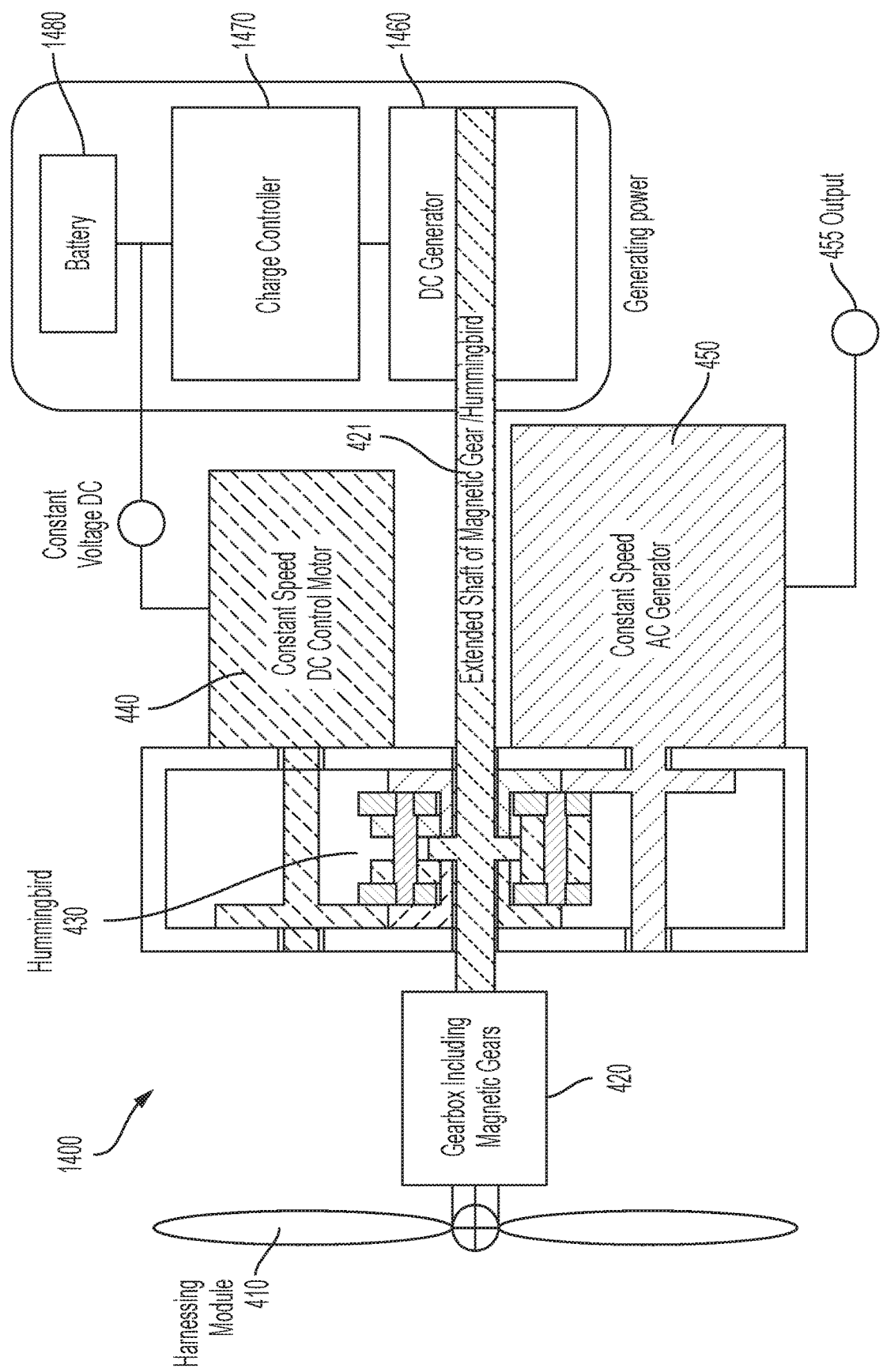
Figure 14. Distributed Power System (Stand-alone Power System)

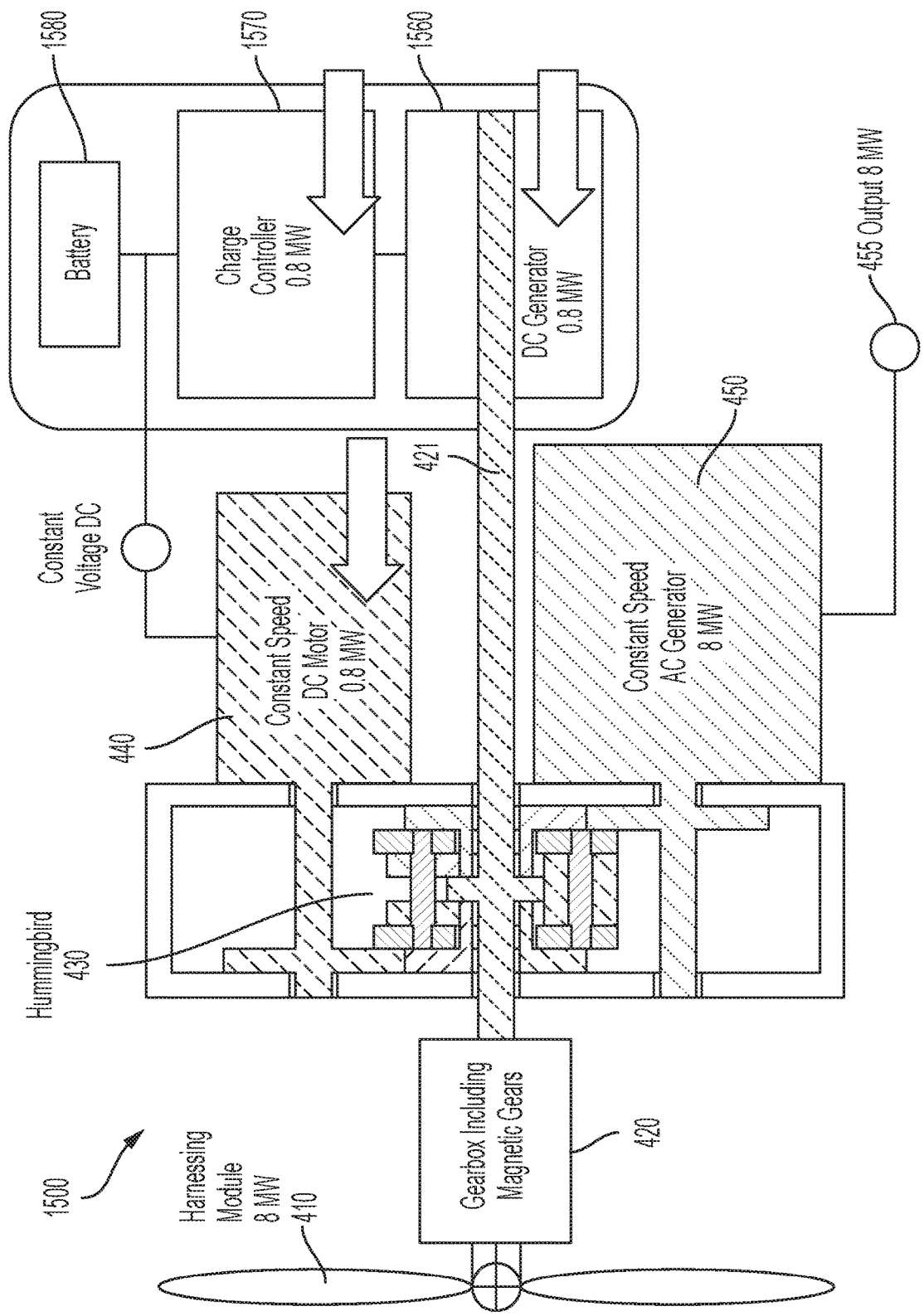
Figure 15. Distributed Power System: Output 8 MW is pre-determined.

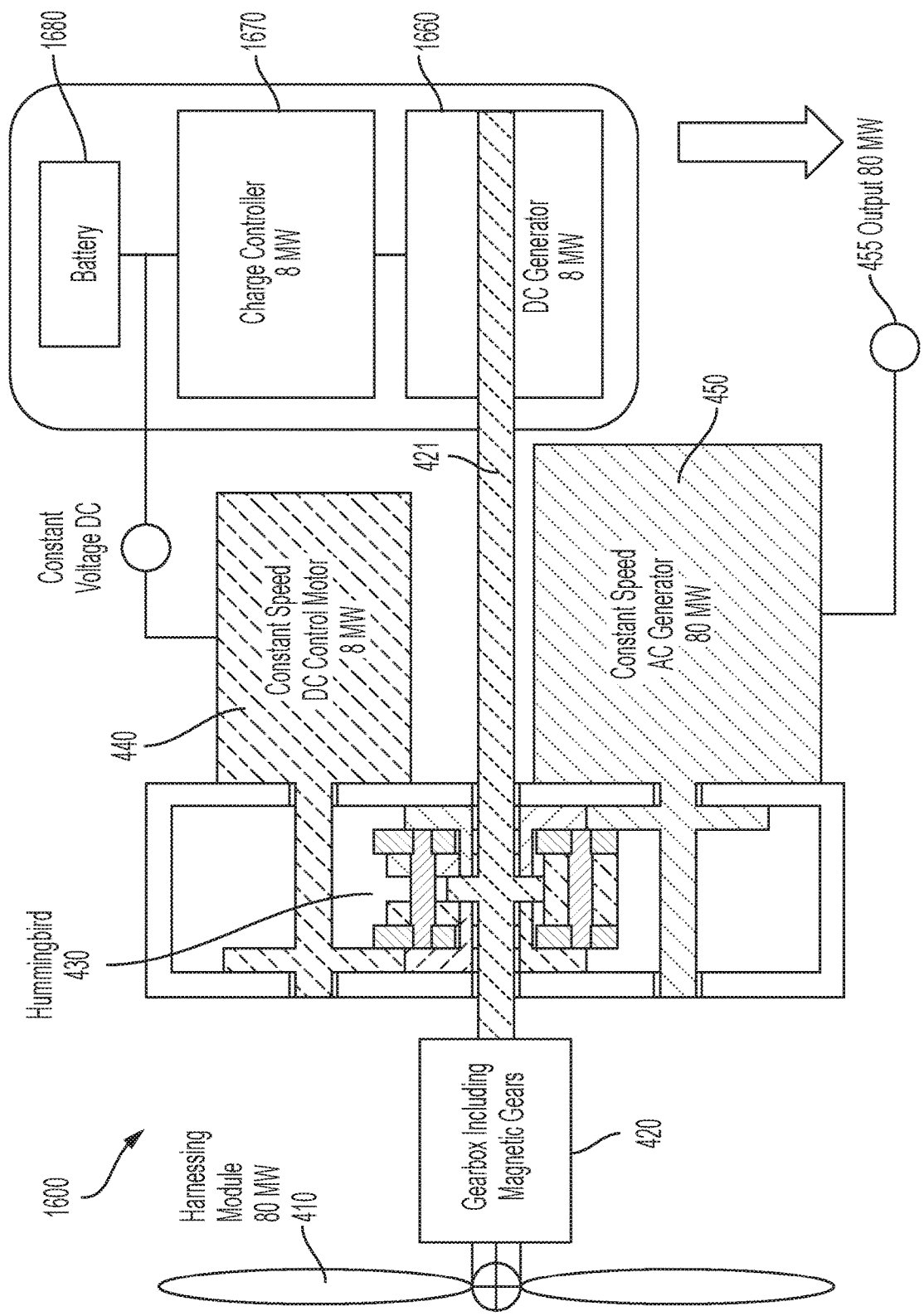
Figure 16. Distributed Power System: Control 8 MW is pre-determined.

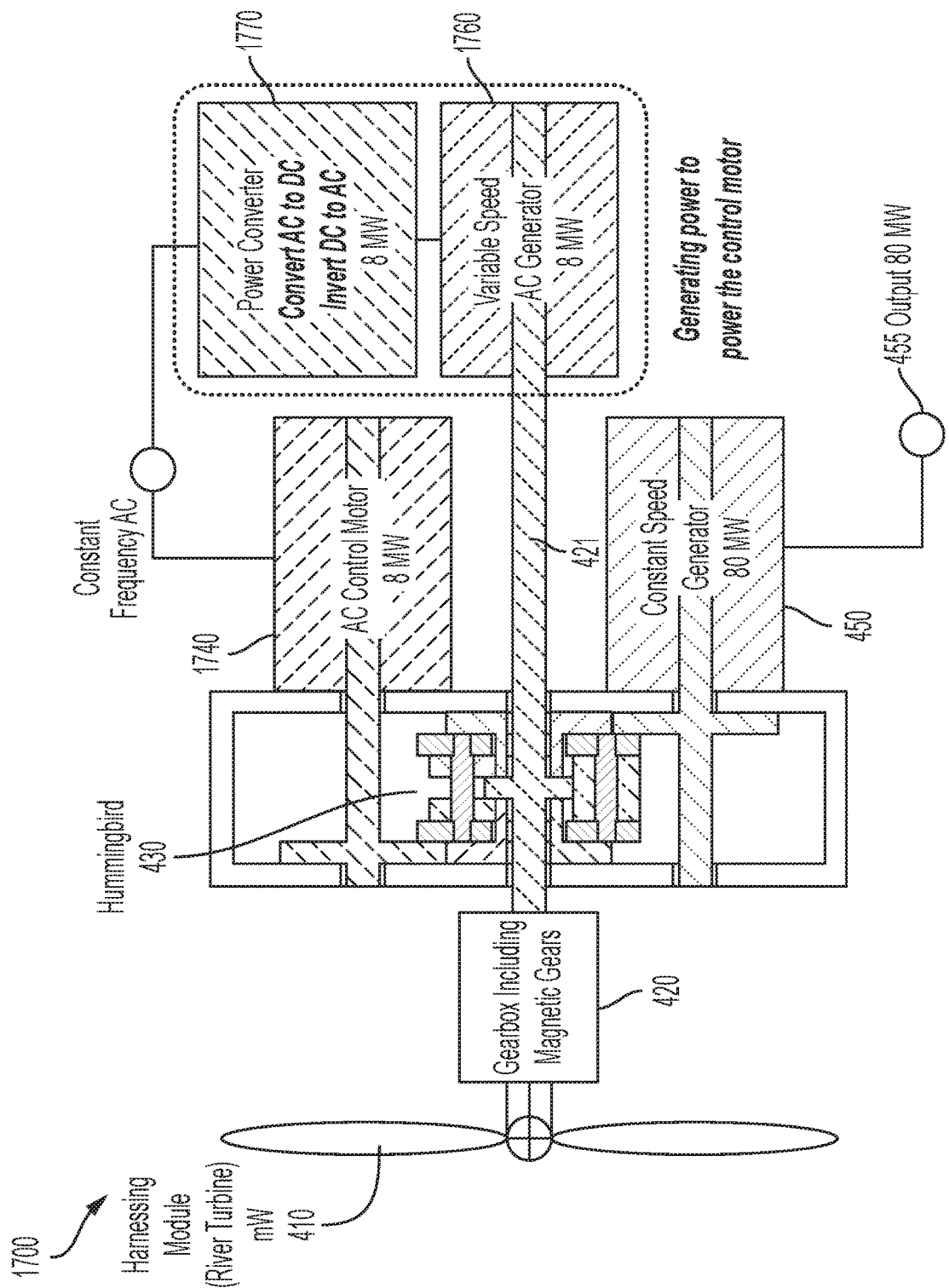
Figure 17. Distributed Power System using Power Converter

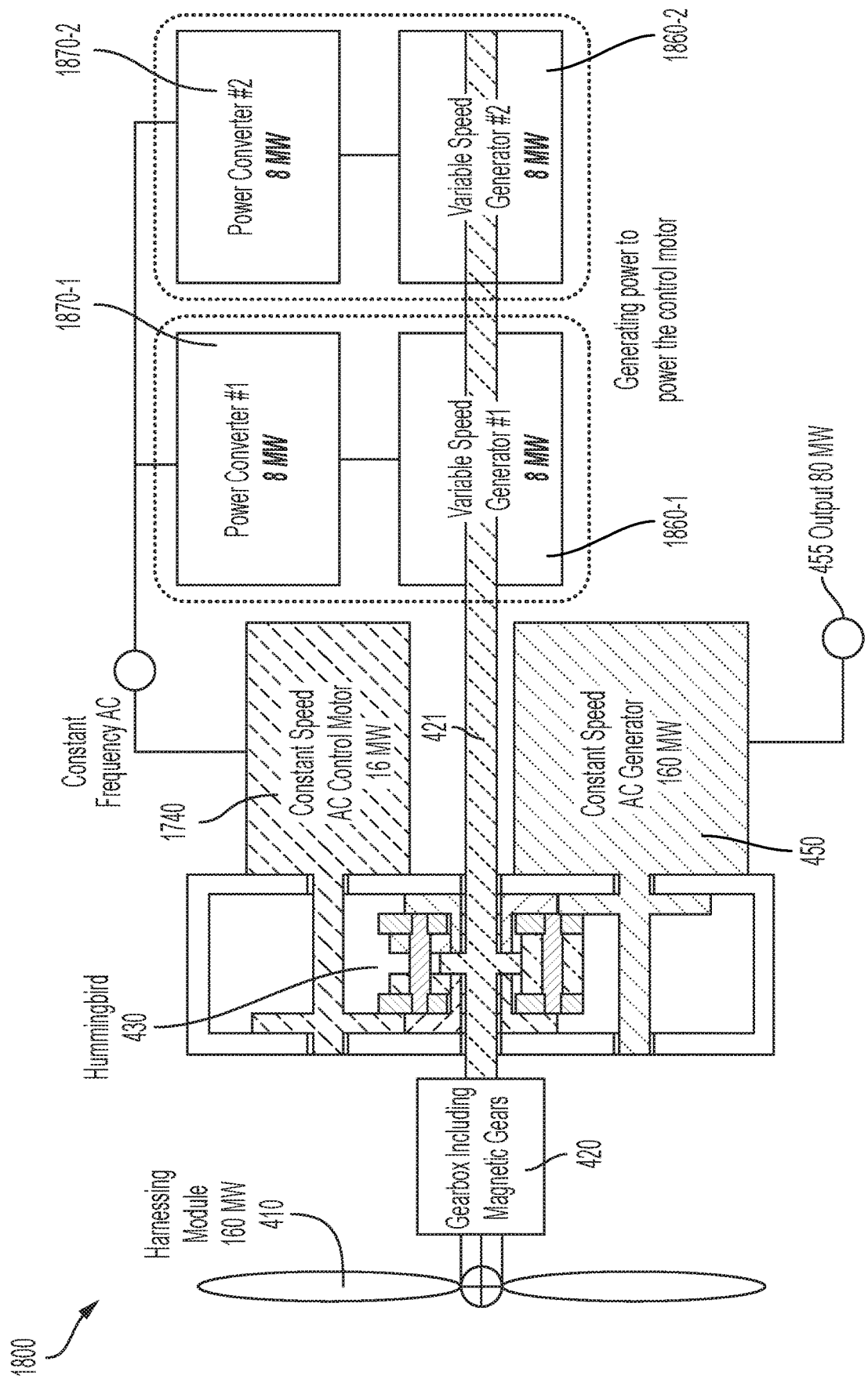
Figure 18. Distributed Power System using Multiple Power Converters

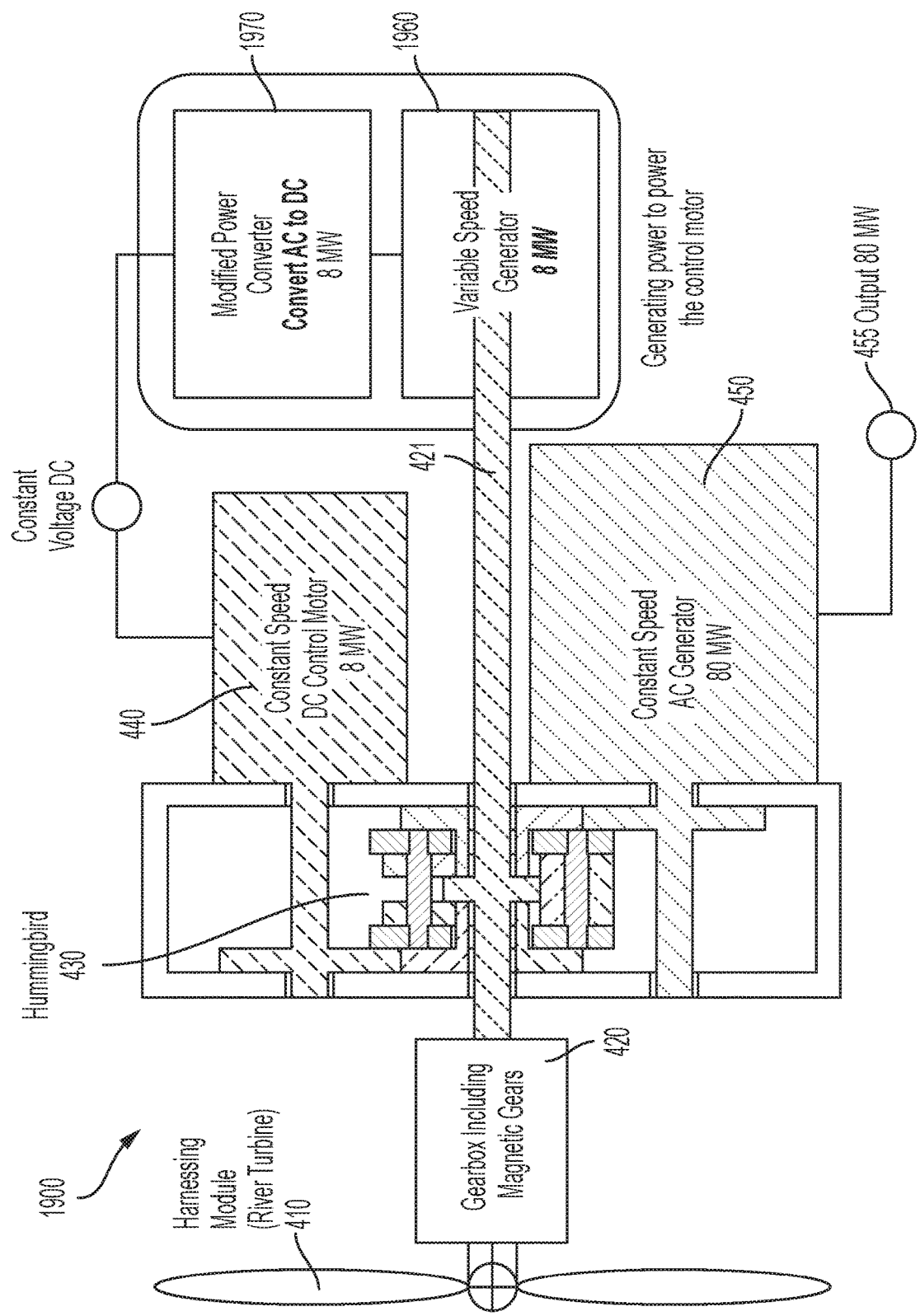
Figure 19. Distributed Power System using a Modified Power Converter

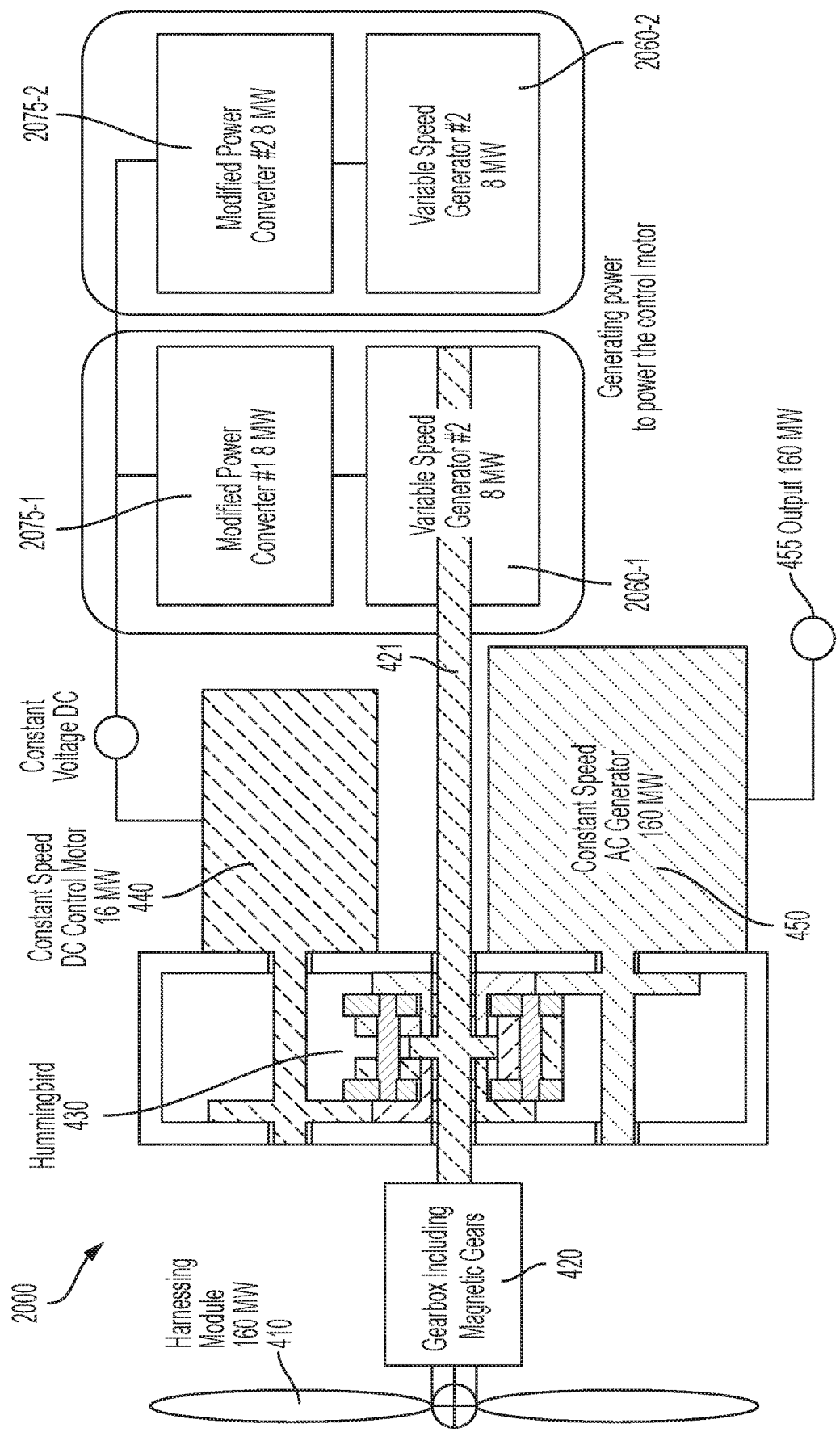
Figure 20. Distributed Power System using Multiple Modified Power Converters

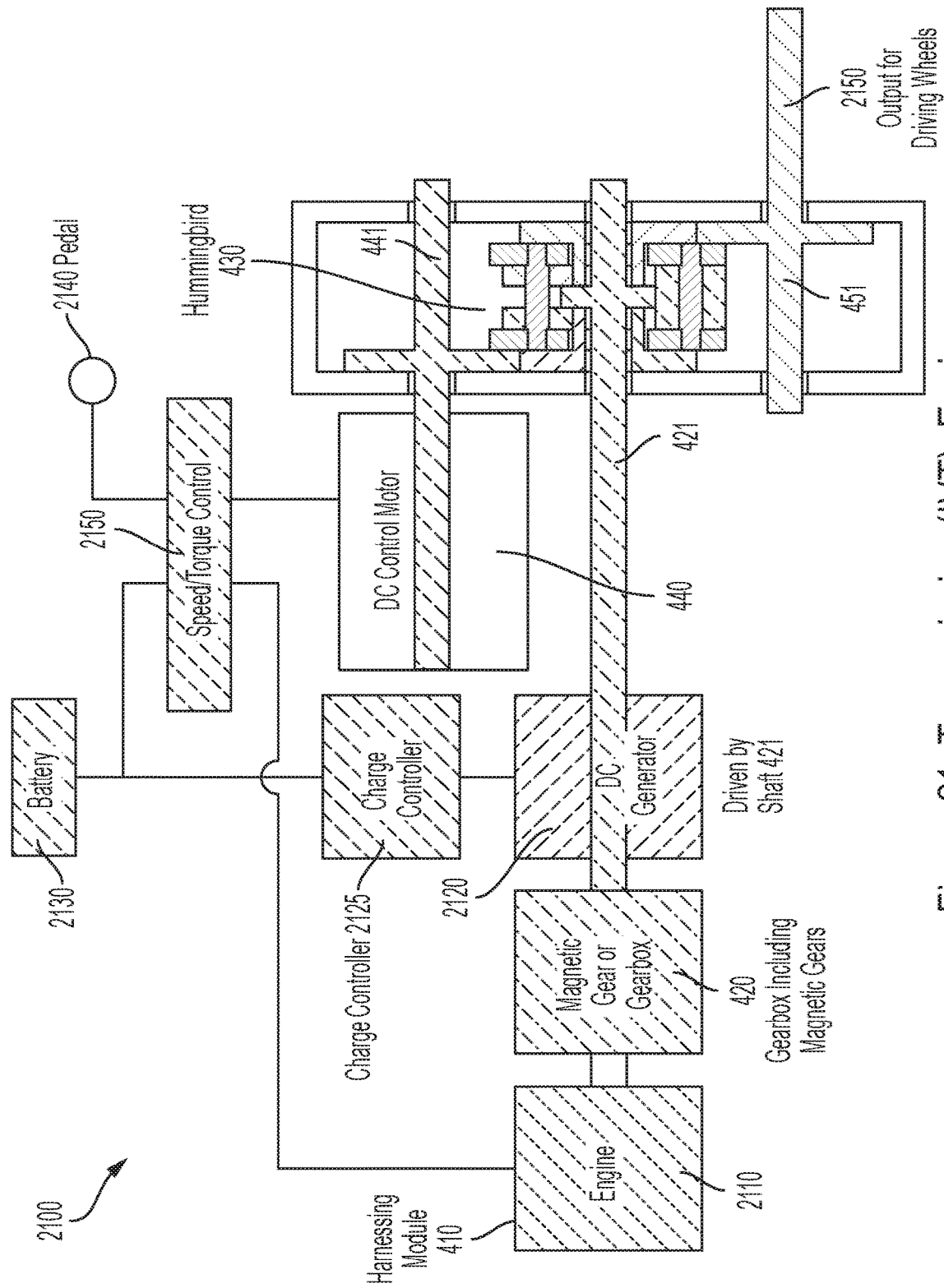
Figure 21. Transmission (IVT): Engine

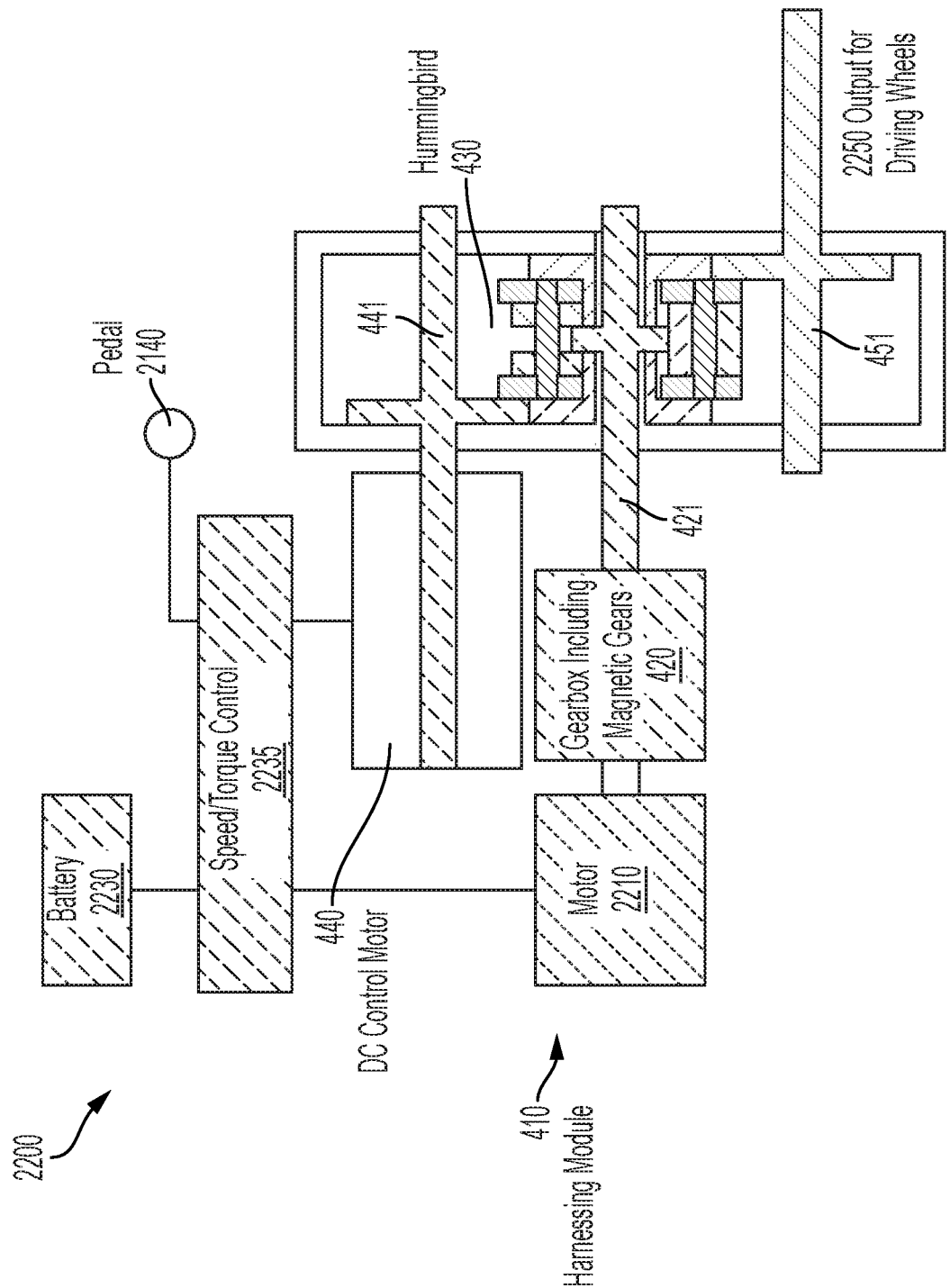
Figure 22. Transmission (IVT): Motor

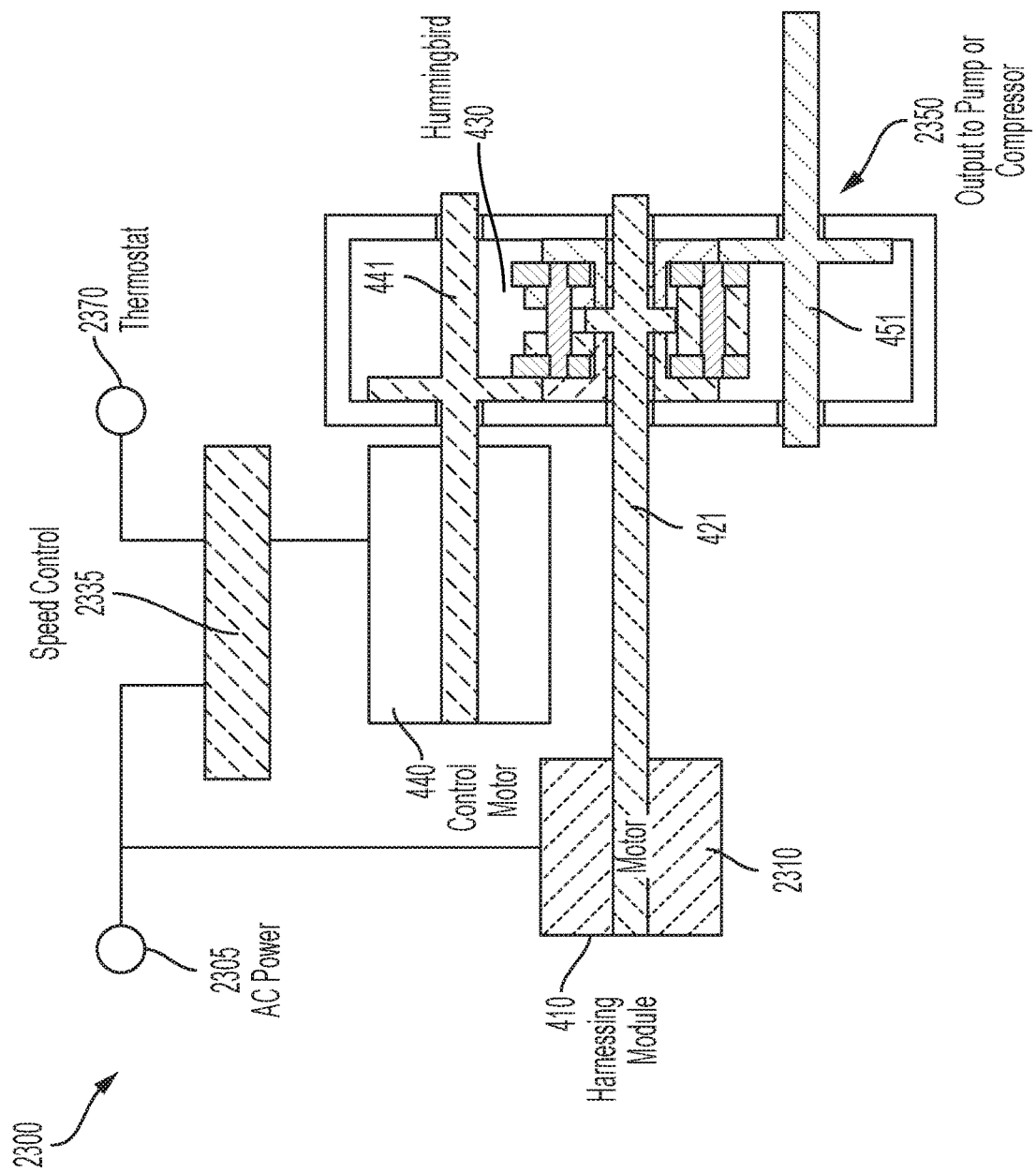

EXPANDABLE POWER MARINE HYDROKINETIC TURBINES, PUMPS, COMPRESSORS AND TRANSMISSIONS

This application is a continuation-in-part of U.S. patent application Ser. No. 14/134,595, entitled "River and Tidal Turbine with Power Control," filed Sep. 18, 2018, by Kyung Soo Han, and is incorporated by reference matter as to its entire contents.

TECHNICAL FIELD

The technical field of the invention relates to providing an expandable power and versatile marine hydrokinetic or wind turbine, for example, as well as infinitely variable transmissions, pumps and compressors. These may comprise an electro-mechanical speed converter or a power converter which converts variable rotational speed to constant speed and may utilize a variable torque and power generator (VT&PG), for example, to control output torque, output power, output power frequency or rotational speed. Marine hydrokinetic turbines and wind turbines may be used for generating alternating current electrical energy where grid power is available or not available and, more particularly, to a marine hydrokinetic or wind turbine for efficiently collecting (harnessing) hydrokinetic energy (water energy) or wind energy which may be controlled by Transgear helical/spur gear assemblies as controls, for example, such as at least one spur/helical gear Transgear assembly formed into a Hummingbird assembly having input, output, and control variables and a marine hydrokinetic or wind turbine utilizing, for example, a VT&PG, a rotary frequency converter for regulating output electrical power generated by the turbine to a relatively constant output frequency so that the power may be immediately usable by a private entity local grid (for example, to power a factory) or in a larger electric grid (such as a public electric power grid). A control motor, battery source, grid source or other source of control power may be amplified by at least ten times according to the amount of input power provided by water or wind according to the cube of the effective water or wind velocity.

BACKGROUND OF THE INVENTION

Hydroelectric energy is one source of so-called renewable energy. About 48% or almost half of all electric energy is produced by steam generation using coal. Natural gas provides about 18% of U. S. electric energy, and nuclear energy now provides about 22% via steam generation. Petroleum, such as oil, is used to produce only about 1% of U. S. electric energy. Coal, natural gas and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric and marine hydrokinetic energy) sources. The great Coulee dam, Hoover dam and the Tennessee Valley Authority are exemplary of projects started in the early $20^{th}$ century in the United States. Large hydro-electric generators in such dams on rivers in the United States are now being replaced with more efficient and larger capacity generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lakes provide water control and recreational use for boating, fishing and the like. Nevertheless, there remains a need for a device that may save the cost of building a dam, permit the marine hydrokinetic or wind turbine generation of electricity and use the inherent flow of a river or the flow of ocean currents, tides and waves or wind velocity which may vary with the weather.

While hydro-electric energy amounts to the next greatest renewable source at about 4%, it is believed that more can be done to efficiently utilize the rivers, tides and ocean currents in the United States and near its shores than by hindering the flow of water commerce by the construction of dams. This patent application concentrates on the application of river current and wind but may be utilized for tidal or ocean current as well.

Other renewable sources include geothermal and solar energy. While these are "clean" sources, to date, their growth has been unimpressive. Only wind energy is presently supported by the Department of Energy, and wind energy is forecast to grow from 0.55 to 20% of all US energy in approximately twenty years.

Further detail of a conventional turbine is described in WO 1992/14298 published Aug. 20, 1992 and assigned to U. S. Windpower, Inc. A variable speed rotor may turn a gearbox to increase the rotational velocity output of the rotor and blade assembly. For example, a so-called cut-in speed (rotational velocity) of a rotor, for example, may be about six (6) revolutions per minute (when electricity may be generated) and the rotor blade may typically cut-out at about 30 revolutions per minute (a maximum for electricity generation without damage to the turbine) by controlling the pitch of the rotor via a pitch control system during conditions of high wind velocity and to reduce rotor blade noise. Typically, wind speeds over three meters/sec are required to cause the large rotor blades to turn at the cut-in speed (rotational velocity). Wind frequency between cut-in and cut-out speeds (velocities) has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines do not have sufficient wind speed to operate at all depending on weather conditions, placement and the like.

Also, a mechanical gearbox for a wind turbine is known to have a failure rate of approximately 5%. Electronics used in a wind or marine hydrokinetic turbine has the highest potential failure rate of 26%. Control units generally exhibit a failure rate of 11%. Sensors and yaw control exhibit approximately a 10% failure rate. The failure rate of a variable frequency converter may be on the order of 26% (electronics) according to an ongoing consortium's study of drive train dynamics at the University of Strathclyde, Glasgow, Scotland. According to published information, the mean time between failures of a 1.5 megawatt wind turbine, for example, may be only two years on average (but the real failure rate is an industrial secret); and the replacement cost may be over $50,000 (for example, $50,000 to $100,000 US) per variable frequency converter. A failure rate of the variable speed generator of a known wind turbine is on the order of 4.5%. Consequently, problems related to known wind turbines relate closely to the failure rate of gearboxes, generators, variable frequency converters and associated electronics and inefficiencies of operation. Such failure rates and the inability to utilize the full input power provided by wind or water (rather than designing for a cut-off speed that is limited) limits the levelized cost of energy in comparison with conventional power generation (coal, oil, natural gas and nuclear, for example).

A solution to the identified problems is to provide a constant rotational velocity as an input to a constant speed electric generator so that the generator in turn can produce a constant frequency output and deliver the power directly to a drain on electricity such as a factory or to a local or public electricity grid without any limitation on cut-off speed of wind or water. Tidal turbines have been developed or are under development by the following entities: Verdant, ORPC, Tocardo and Open Hydro. Verdant has on/off switch control while ORPC, Tocardo and OpenHydro use known power converters which convert variable speed (for example, tidal current flow) into constant frequency. Many of the problems of tidal turbines are carried forward into river turbines and other marine hydrokinetic turbines. There is the same problem of having to convert a variable frequency input to a constant frequency output. On the other hand, the density (mass) of water is much greater than that of wind and water flow is continuous (rivers typically do not stop flowing) so the capability of generating more usable power is greater in such systems.

Usable power is a function of water flow (wind velocity) and its speed. For example, if water flow exceeds a given velocity, the Tocardo unit lifts its propellers/rotor blades out of the water cutting back on usable power and so power generation is limited to the cut-off water velocity. Generally, for example, rivers flow in one direction and the major ocean currents do the same. On the other hand, available rotor power P with river current flow rate (or wind speed) is given by the equation:

$$P = \frac{1}{2} \rho A \, v^3 C_p$$

(where $C_p$ is a coefficient) and Power P varies by the cube of the input water flow rate or wind velocity v.

Note that the power increases with the cube of the water flow rate or wind velocity/speed and, consequently, if water velocity is limited (or cut-off) as in Tocardo, there is considerable available power left that could be generated but for Tocardo having to lift their propellers out of the water, for example, due to high or changing tidal currents. Tocardo and most other tidal and wave turbines have a cut-off water flow rate that limits output power. The same can be said for wind turbines which, for example, intentionally limit the impact of high wind velocity by, for example, changing the pitch of propellers during high wind speed and, as already explained, use inefficient and high failure rate electronic power converters which change variable alternating current to DC and then back to alternating current.

Wave generation, however, in oceans and other large bodies of water varies in magnitude with wind and weather. Ocean shore waves are more predictable and a strong undertow can be useful for electric power generation. Tides are reversible and associated turbines may be limited to one direction of water flow. Tocardo tidal turbines are bi-directional. River flow and wind turbines with wind or water directing vanes have a single direction of flow so that a uni-directional rotor blade design may be simpler (fewer moving parts, for example, for variable pitch).

A concept for improving wind turbines is use of a mechanical direct drive in which a rotor and a shaft drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, use power converters and so result in reduced down time for repairs at the expense of increased cost due to the direct drive assembly. A speed converter to convert variable speed to constant speed is disclosed in priority U.S. Pat. No. 8,388,481 of Kyung Soo Han. The speed converter is entirely mechanical and so improves upon the high failure rate, reliability and efficiency of known electrical/mechanical systems. Speed converters under development are shown in this and other priority patent applications and are referred to as infinitely variable speed converters.

Traction drive infinitely variable transmissions are known produced by Torotrak and Fallbrook. The Fallbrook device may be described by U.S. Pat. No. 8,133,149. A 2004 report, NREL/TP-500-36371, however, concluded that the Fallbrook device is not scalable. Further speed converters are described by FIGS. 10 and 11 of U.S. Pat. No. 8,641,570 of Key Soo Han of Differential Dynamics Corp. (also known as DDMotion). The DDMotion speed converters are differentiated from those of Torotrak and Fallbrook by their gear drives (no toroids, pulleys or belts) and that they are scalable and are not limited to a cut-off wind or water velocity.

The variable torque and power generator (VT&PG), also referred to as a variable overlap generator, has been described in priority U.S. Pat. Nos. 8,388,481; 8,485,933; and 8,702,552 as well as DDMotion PCT/US2010/042519 published as WO2011/011358. In the following Detailed Description, three different terms will be used to describe three different functions where variable torque generator (VTG) emphasizes the use or function of a variable overlap rotor/stator embodiment as a torque generator; variable power generator (VPG) emphasizes the use or function as a power generator; variable torque and power generator (VT&PG) emphasizes the functions of both generating torque and generating power while a variable overlap generator (VOG) describes the overlap or axial alignment of a rotor and stator at any given position in terms of degree of overlap of rotor and stator from a minimum to a maximum overlap. The variable torque and power generator (VT&PG) or variable overlap generator (VOG) has one of an axially moveable rotor and stator with respect to its stationary or moveable counterpart stator or rotor so as to vary the amount of overlap by the stator/rotor with respect to the rotor/stator from a minimum when the stator is displaced from the rotor to a maximum value when the stator and rotor are proximate to or completely overlap one another.

In particular, there is described in, for example, WO2011/011358 or U.S. Pat. No. 8,388,481 (the U.S. '481 patent), the concept of measuring torque/rpm on an output shaft of a system such as a wind or river/tidal/ocean wave/ocean current turbine (which may be referred to herein as a marine hydrokinetic (MHK) turbine) for providing a constant output from a variable flow input. The measured torque/rpm value may be compared with a torque/rpm value stored in a memory and, if the measured torque/rpm is high in comparison, then, the moveable rotor or stator of a variable torque generator may be moved axially to a position more in keeping with the high measured torque/rpm value, i.e. such that the stator is moved towards or away from the rotor axially under motor control through a feedback loop. When the measured torque/rpm is low in comparison with an expected value, the moveable rotor or stator may be moved axially toward one another to match a low value of torque/ rpm so that the speed of the output shaft may increase and vice versa. This variable torque and power generator or variable overlap generator process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U. S. electric frequency or in Europe 50 Hz European frequency electric power and may be used in wind turbines.

In either the priority '481 U.S. patent or the WO 2011/011358 printed publication priority documents, FIG. 8 shows the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. In FIG. 10 of the priority '481 U.S. Patent, the rotor and stator of the variable torque generator are shown such that the rotor 810 is directly coupled to the shaft 820. "When the stator parts 830(*a*) and 830(*b*) are moved away from rotor 810, a minimum input torque results. The operation of a control may be as follows via measuring a torque value stored in memory proximate to the maximum torque that a given rotor shaft 820 may receive (a maximum allowable torque value), the stator parts 830(*a*) and 830(*b*) may be moved by a motor (not shown) to be in removed torque position or a position in between maximum and minimum torque positions whereby a close-to-maximum torque position may be achieved in relation to the measured torque and the maximum allowable torque(/rpm) value or value stored in memory."

Three variable and four variable Transgear assemblies are discussed in detail in U.S. Pat. No. 9,506,534 of Kyung Soo Han issued Nov. 29, 2016, and incorporated by reference as to its entire contents. The variables may be input, output or control variables in any combination. A Transgear is not discussed in great detail herein but has been described multiple times by Mr. Han in prior patent applications as a means for obtaining relatively constant output from variable input speed (such as wind and water). Two Transgears may be formed into a Hummingbird for input/output regulation or control as will be described herein.

Michael Faraday (1791-1867) is credited with the formulation of Faraday's law and at least the construction of one of the first, if not the first, direct current generator. Faraday's law may be simply stated as follows: an electromotive force may be generated in an electrical conductor (such as a copper wire or coil of wire) which encircles or is encircled by a magnetic flux, for example, caused by the presence of a permanent magnet proximate the coil or coils. Many renewable energy efforts such as the wind turbine discussed above attempt to harvest natural sources of mechanical energy (wind, tides, waves, water flow and so on) to produce electricity. Because these sources fluctuate in power/speed such as wind energy or water flow rate applied, standard generators using permanent magnets and fixed windings may deliver unregulated voltage and frequency, for example, as seen by a requirement in known wind energy systems to generate DC from variable AC and then recreate a constant AC voltage and frequency from the converted DC.

New direct current generator designs such as the synchronous or induction singly-fed generator, the doubly fed generator or the brushless wound-rotor doubly fed generator are seeing success in variable speed, constant frequency applications, such as wind, river and other renewable energy technologies. However, such systems are complicated and are prone to failure even though they show gains in efficiency over a brush-less, commutator-free system. Consequently, problems related to known wind and water turbines relate closely to the failure rate of gearboxes, generators, variable frequency converters or variable power converters and associated electronics and inefficiencies of operation and there remains a need in the art for a brushless, commutator-free DC generator that is not prone to failure.

There remains a need in the art to provide applications of such a variable torque/power generator assembly as well as a controlling module, a generating module and two spur/helical gear assemblies (two Transgear gear assemblies) described herein as a Hummingbird assembly, in connection with the generation of electrical energy/power (variable torque and power generator, VT&PG) from renewable sources such as wind and river/tide/ocean wave/ocean current, that is, a marine hydrokinetic turbine electric power generator among other possible applications in wind and river turbines for generating electric power at constant alternating current frequency with or without a power grid. A river or wind turbine, for example, may comprise an assembly of three modules and a Hummingbird. The three modules are a harnessing module, a controlling module and a generating module. A Hummingbird has three variables (an input, an output and a control) and the three modules are attached to the Hummingbird where the harnessing module provides the input, the controlling module provides the control and the generating module provides the output. A river or wind turbine without a harnessing module may be called a C&G (controlling and generating) module. A C&G module has an input which is provided by the harnessing module typically wind or water. A C&G module is also a rotary frequency converter because as it generates power, it does so at a desired frequency such as fifty Hertz (European) or sixty Hertz (US). The Hummingbird which will be referred to herein with the C&G module as a CG&H module is the three variable connector for the harnessing, controlling and generating modules or connects three modules: harnessing (input) (comprising propeller or waterwheel), controlling (constant speed control motor) and generating modules (generator, for example, a VT&PG, VOG, VPG or VTG generator).

SUMMARY OF THE PREFERRED EMBODIMENTS

Embodiments of a variable torque and power generator (VT&PG) associated with wind and river/tide/ocean wave/ocean current, marine hydrokinetic (MHK) turbine equipment or other application that is scalable may comprise a VT&PG, also referred to herein as variable overlap generator (VOG)), wherein there may be an adjustment of the relative axial overlap between the rotor and stator to control speed and torque independently between a minimum overlap and maximum overlap of rotor and stator. A suggested application is in the potential application of a VOG in wind and river/tidal/ocean wave/ocean current (MHK) turbines along with the use of two spur/helical gear assemblies of sun gears, sets of planetary gears and carrier gears and brackets referred to herein as a Hummingbird pair of Transgear gear assemblies which may amplify the output of a constant speed control motor by the cube of input wind or water velocity. For example, a river turbine having a relatively constant water flow rate may use the Hummingbird assembly to multiply (amplify) its control power input by ten times (or more), the upper limit having not been determined, while a multiple or amplification of ten times has been demonstrated in a laboratory setting.

In wind and MHK turbines, a speed converter is used for the purposes of adjusting the speed of the input which may be slow or fast depending on the rate of wind speed or river flow rate with respect to a desired constant output speed (rotational velocity or electric power frequency) for generating electric power to be privately used or fed to an electric power grid. One embodiment considered provides mechanical synchronization of variable input to constant output. In particular, it is suggested that there be an adjustment of the relative angular (radial) relationship between the rotor and stator in addition to the concept of adjusting the (axial) position lengthwise of a moveable rotor or stator in a VTG or VPG or VT&PG or VOG for variable torque/power with input velocity and desired output frequency. This concept is especially useful for mechanical speed converters for synching the phase angle of variable input with, for example, a desired constant output velocity (convertible to electric power frequency, for example, at 60 Hz US and 50 Hz European).

A further practical application of VPG is to provide a reciprocating input to a fixed power generator (FPG) or a variable power generator (VPG) for generating electricity with a reciprocating rotor. This concept eliminates the need for Sprags from the speed converter described in the priority patent applications and patents, and reduces cost, weight, size, and potential validation time.

A further practical application of VPG may be to provide reactive VTG with respect to waterwheel control in a river/tidal/ocean wave/ocean current, marine hydrokinetic (MHK) turbine. In this embodiment, the VPG may increase torque to the generator in MHK or wind turbines (or any variable load) for control of a waterwheel (or propeller/blades) or hatch of such a MUM turbine. In a MHK turbine, the reactive torque control (for example, a feedback control between input speed sensing and output frequency regulation) may be applied to control waterwheel/propeller speed until reactive control reaches a designed maximum and then hatch control may be used for further waterwheel speed control with respect to desired output electrical power frequency, especially in high water caused by weather such as heavy rainfall of a hurricane.

A variable torque and power generator (VT&PG) useful in all embodiments controls torque/rpm from a maximum to a minimum. The utilization of a variable power generator has been validated by the University of Maryland, Baltimore County, as a useful control device for controlling output shaft rotational velocity at a constant value with respect to a variable input shaft rotational velocity. For steady flowing streams and rivers, without much flow rate variation, a constant speed output can be easily produced by compensating the input.

In MHK turbines, for example, the VT&PG may be used to advantage regulating output shaft rotational velocity to a constant value.

Embodiments of an MHK or wind turbine according to the present invention may typically comprise a harnessing module for harnessing the power of wind speed or river flow rate where clearly river flow rate, because of the high density of water, has the ability to generate the most electric power. A harnessing module may comprise at least one of a propeller or waterwheel, may further comprise a flywheel for regulating speed and energy to a more constant value, may comprise magnetic gear box assemblies which are capable of slipping if, for example, a gust of extreme wind or a river flow rate accelerated by severe weather may cause gear breakage of a normal mechanical gearbox, but the magnetic gear box is also capable of better matching the expected input rotational velocity from a propeller or waterwheel to the rotational velocity needed for developing electric power (at a constant frequency) or other uses of a Hummingbird, a constant speed control motor and an output generator.

A flywheel is a spinning wheel or disc which may be added to help conserve the kinetic energy of its rotational energy. Energy is stored in relation to the cube of angular velocity and thus preserves the cubic nature of energy generation of a wind or river turbine related to its input flow rate or speed. In summary, then, the harnessing module of an embodiment of a wind or river turbine according to the present invention may comprise a propeller or waterwheel, a flywheel and a magnetic gear box assembly in combination to best match the expected harnessed energy with the provision of a maximum of output electric energy.

The output rotational velocity of a harnessing module is provided as the input rotational velocity to an input shaft of a Hummingbird assembly of two Transgears mounted side by side and sharing the same input shaft carrying first left and second right sun gears for driving each of the left and right Transgears. This harnessing assembly along with a control motor and a variable torque and power generator (optional) may comprise a controlling module and a generating module for controlling and generating electricity via a Hummingbird. The output power may be a portion of the input power that is selectively harnessed by the constant speed control motor. By using an AC or DC generator and a charge controller or a power converter in series, two or three units or more, the control power rating may be doubled or tripled and so the output power greatly multiplied.

Applicant always considered his invention of a Transgear to be a switch that helps to regulate variable input to constant output. Applicant now recognizes that a harnessing module coupled with a controlling module and a generating module may be utilized for the purpose of multiplying or amplifying a control value of power by the power generated by the harnessing module and has demonstrated multiplication factors on the order of ten times in the laboratory unlimited by any cut-off speed of the wind speed or water flow rate input of known wind and tidal/wave or river turbines.

There are many varieties of the key component called a Hummingbird which may comprise a left and a right Transgear in series with one another and connected by a connecting gear and simplifications thereof. These Hummigbirds are described in pending patent applications and in this patent application. Generally, the left Transgear receives an input of a value, for example, +a change in rpm based on the flow rate of water or the wind speed. A control input is provided by a shaft-surrounding sleeve and gear which further provide an output through a carrier gear to a connecting gear to the right Transgear assembly. The right Transgear assembly of a Hummingbird comprises a right sun gear driven by the harnessing assembly input, has a control input passed to it via the connecting gear and comprises a carrier and an output which may be regulated by a variable torque and power generator (VT&PG) and controlled by a constant speed control motor providing an input power level used to generate a multiple (amplify) the input water/wind speed so as to generate a multiple such as ten times the input power, with no cut-off speed, so long as the typical wind and river flow speeds are taken into consideration in designing the control motor power, magnetic gear box, Hummingbird and other components. As will be demonstrated herein, a left and right Transgear Hummingbird may have different forms and may be simplified to have fewer moving parts in alternative embodiments.

The constant speed control motor may provide a constant alternating current, direct current or even be powered by a battery or series of batteries so that the harnessing module, controlling module and generating module may be used to generate a multiple of constant electric power input in remote areas where an electric grid does not exist. The batteries may be used with a charge controller and a direct current generator to form a value of constant power for a constant speed control motor, for example, as a battery back-up. Moreover, the constant speed generator rating may be multiplied (by including two or more constant power generators) so that the output electric power may be multiplied by connecting the control generators, charge controllers, power converters or batteries in series with one another to develop higher values of constant electric power. For this reason, the title of the present invention is deemed "expandable power" by adding more constant input power that may be multiplied as output power.

A solution to a problem of providing a constant speed DC current generator, for example, when no grid exists to provide power to a control motor, is to provide a constant rotational velocity as an input to the constant speed electric generator so that the generator in turn can produce a constant frequency output and deliver a constant voltage and variable current. A brushless direct current generator may comprise a cross-section having a shaft at the center (coming out from the page). Tied to the shaft is a rotor comprising a plurality of permanent magnets shown and discussed herein having North and South polarity. While the south pole is shown closest a shaft, in alternative embodiments, the North pole may be closest the shaft. The N/S permanent magnet pairs may form a plurality of, for example, six permanent magnet pairs of a rotor (or a range of more than four permanent magnet pairs up to, for example, a practical number such as eight or sixteen may be used); however, any number of permanent magnet pairs may be used and produce magnetic fields coupled with electric wire coils of a stator to directly generate electromotive force (EMF). A loop of coil conductor is wound in such a way that when the permanent magnet pairs are rotating, the rotating magnets cut the coil and EMF will be produced. Direct current is generated in one step, directly. The coils provide the generated direct current according to Faraday's law except, in this case, with the same polarity rather than alternating polarities (alternating current). There are no commutators or brushes needed which may wear out, and the brushes will not cause the coils to short. There is no need for a rectifier bridge to smooth the direct current output. As seen in FIG. 13(B), the circuit diagram for FIG. 13(A) is shown whereby a direct current voltage (VDC) is output by the electromotive force generated by the coils.

The principles of a harnessing module and a controlling and generating module including a Hummingbird may also be applied to vehicular transmissions, pumps and compressors as will be further demonstrated herein.

These and other embodiments and features will be described with respect to the drawings, a brief description of which follows.

BRIEF DESCRIPTION OF THE DRAWINGS

FIG. 1 provides a corresponding perspective view of an exemplary MHK turbine 100, for example, located so as to receive water flow 110 from the left and generate electricity. The MHK turbine 100 may have a sloped block 101 (shown in FIG. 1) for channeling the water flow toward a hatch 102 which is shown in an almost open position with respect to a waterwheel 103. The hatch 102 may protect the waterwheel 103. The waterwheel 103 will turn more freely if the hatch 102 is open and exposes the waterwheel 103 to the entire water flow. The hatch 102 may have an associated hatch control. The hatch control may open/close the hatch 102 to a number of positions over the waterwheel 103 so that maximum or appropriate water flow will drive the waterwheel 103, and a shaft and an arrow 105 point to a generator (not shown). Generator 105 (first shown in FIG. 4 as generator 450) is driven by the waterwheel 103 turning a shaft of a gearbox 104 including magnetic gears produces output power at a desired constant frequency to a power grid regardless of input water flow rates. A harnessing module may comprise, with reference to FIG. 1, a river turbine for driving an output shaft carrying a flywheel (not shown) for power regulation and a magnetic gear assembly for gear box protection and for multiplying the rotational speed of the input shaft (for example, in wind turbine applications). The output shaft or any shaft coupled to the waterwheel or wind propeller may comprise a VT&PG or VOG (briefly described below with respect to FIG. 3).

FIGS. 2A and 2B provide a cut-away view of an embodiment of a magnetic gearbox or magnetic gear 200 where harnessed wind or river energy by a propeller for wind or a waterwheel for a river turbine provide input to the magnetic gearbox or first and second magnetic gears for changing the input revolutions per minute to one more compatible with a controlling, generating and Hummingbird assembly module (C, G & H module) yet to be described with reference to FIG. 4. FIG. 2A shows first magnetic gear rotors and a magnet array and FIG. 2B shows second magnetic gear rotors and magnet array that may firmly attach to one another so the magnets of the magnetic gearbox of FIGS. 2A and 2B firmly grip one another except during a heavy gust of wind or water when the magnets slip. Magnetic gear assemblies thus may be used to prepare magnetic gear boxes for matching input rotational velocity to output velocity for input to a Hummingbird assembly as will be further described herein per FIG. 4. Also, an optional flywheel (not shown) may be used to preserve the kinetic energy developed by the wind or water input and to help stabilize the rotational velocity of an output shaft.

FIG. 3 provides a perspective view (an exaggerated view to emphasize the minimum variable overlap of rotor and stator) of a variable torque and power generator (VT&PG) 300 or variable overlap generator (VOG) showing a shaft 105, 301 (taken from FIG. 1) which may be integral to or fixedly attached to a rotor 302 displaced at a minimum/maximum overlap (or any position in between) or torque position from a stator 303 (minimum or no overlap shown), a means of moving the rotor 302 to a maximum position being, for example, a motor (not shown) such as a servo motor under feedback control to match desired torque with desired shaft 105, 301 rotational velocity, for example, when water flow rate or wind speed are sensed and determined to require torque adjustment to better provide a maximum constant output speed or power frequency. The same principle applies to variable overlap motors (VOM).

FIG. 4 shows a basic embodiment of the current invention river turbine 400 showing a harnessing module 410 (Waterwheel 103) connected to a controlling module 460 (consisting of magnetic gearbox 420, Hummingbird (assembly) 430, and control motor 440), generating module 470 (generator 450) and output shaft 451 from Hummingbird (assembly) 430 to generator 450. Control motor 440 may be either an AC or a DC motor herein and will be identified as AC or DC when the reference numeral 440 is used. The Hummingbird 430 is a mechanical controlling component with three variables comprising a left and a right spur/helical gear assembly 414, 413 respectively referred to herein as a Transgear which is also shown as FIG. 1 in U.S. Pat. No. 8,986,149 of Kyung Soo Han. Generator 450 may be a variable torque and power generator (VT&PG 300 shown in FIG. 3) (overlap not indicated). The electricity produced by generator 450 will be output to electricity grid 455.

FIG. 5 shows a left Transgear component 414 of a Hummingbird (assembly) which may comprise an input first (left) sun gear 515 and a control input (sun disc, gear and sleeve assembly) 520 and output 530 (carrier gear assembly). A Hummingbird may be simplified and be in various structures as will be further discussed herein with reference to FIG. 8. This left Transgear 414 receives the variable input 421 from the harnessing module shaft output (see FIG. 1 shaft and arrow 105) of the preferably magnetic gear box 200 (FIG. 2), a control input 520 from a sun disc, sleeve, and gear assembly surrounding the variable input 421 (shaft) and provides an output via output 530 (carrier gear assembly).

In FIG. 6, there is shown a right Transgear of a Hummingbird embodiment 600 with emphasis now placed on the right Transgear 413. FIG. 6 shows a connecting gear 415 meshing with the output 530 (carrier gear assembly) of the left Transgear 414 shown in FIG. 5 and with the control input 620 (carrier gear assembly) of the right Transgear 413. A further input is provided by the second sun gear 615 of variable input 421 (a shaft) and the output 630 is the sun disc and sleeve/sun gear surrounding the shaft which may drive an electric power generator.

FIG. 7 is a cut view of a complete Hummingbird assembly 700 having both the left 414 and right 413 Transgear assemblies of the Hummingbird assembly 700 showing calculations of a Transgear rule. The minimum variable input 421 is a value of rotational speed X which has, for example, increased in value by +Δ rpm (due to increased wind or river speed turning a propeller or waterwheel of the harnessing module 410). The control input 520 (left sun disc, sleeve and sun gear), for example, from a control motor (not shown) is −X rpm and the control input 620 of the right (second) Transgear 413 is the rotational speed or rpm value of the positive change +Δrpm in rotational speed provided by the left (first) Transgear carrier gear assembly 530 through connecting gear 415. As will be seen, the Hummingbird power output 630 of an assembly comprising a harnessing module, controlling and generating module is a multiple, such as 10 (ten) times (see FIG. 11, for example), of the rotational speed of a control motor received at control input 520 (demonstrated in a laboratory). The degree of multiplier or amplification or value of power output may be greater or less than 10 (ten) times the power in, but a 10 (ten) times multiplier or amplifier has already been demonstrated in a laboratory. The term amplification is borrowed from electronics and indicates that the output power is greater than the control power. In principle, a Hummingbird assembly 700 with three variables can have greater output power than the control power by connecting the input to the output directly. The control is releasing Δ rpm like a relief valve, for example, and the harnessed input power does not go through the control. The output calculation will be further explained later.

FIGS. 8A, 8B, 8C, 8D and 8E show variations of a Hummingbird through simplification of a pair of Transgears to a more compact assembly in FIG. 8F as will be further explained herein. Each depicted assembly comprises a different embodiment of a Hummingbird and all have an input variable, control variable and an output variable. If the three variables are assigned with different functions, the input to output changes accordingly but the same principle applies. The variations of function assignment are not shown here.

FIG. 9 shows an example of a known rotary frequency converter for converting one frequency or value of rotational velocity to a frequency. The present invention provides a similar function as a rotary frequency converter. In the depicted rotary frequency converter 900, a motor 910 provides a constant rotational velocity rpm output as input to a generator 920 which provides an output at a desired frequency, for example, 50 Hz European or 60 Hz US.

FIG. 10 provides an overall schematic and mechanical diagram showing a river turbine 1000 with a simplified Hummingbird (see FIG. 8 for Hummingbird simplification). Harnessing module 410 at left (for example, waterwheel 103) connects to a controlling module (FIG. 4) comprising a constant speed control motor 440 which may be AC or DC run by a constant source of power 1045, variable input 421 (an input shaft) rotating according to a gear ratio of the magnetic gearbox 420 of the harnessing module 410 for increasing a slow wind speed or designed for a water flow rate to increase its rotational velocity and a Hummingbird 430 having three variables: variable input 421, control input 441 and output 451. The harnessing module output is input to a Hummingbird 430 via variable input 421 (shaft) and operates a generator 450 (generating module 470) which may provide power output 455 to an existing grid. (Powering remote regions where no power is available from an existing grid will be discussed herein beginning with FIG. 14.) Constant speed control motor 440 adjusts and maintains the output 455 constant.

FIG. 11 shows a simplified embodiment 1100 of a power multiplying or amplifying wind or marine hydrokinetic turbine where a constant speed control motor 440 which may be powered by a grid 445 at, for example, 0.8 megawatts actually provides, for example, a multiple of 10 (ten) times as much power or 8 (eight) megawatts of output 455 when boosted by wind or river power from the harnessing module 410 and magnetic gearbox 420. The arrow is intended to point to the constant speed control motor 440 rated at 0.8 MW such that if the turbine generates 8 (eight) megawatts, the control motor is rated at 0.8 MW, the generated turbine power being ten times the constant speed control power. In prior art turbines, power conversion is limited to the power converter and a cut-off frequency or rated speed (rated power) determined so as to not damage the turbine (power converter). In the present invention, due to having the three variable control, the amount of output power is virtually unlimited (compared to the current system) by the wind input speed to a propeller or the waterwheel river flow rate and by the power rating of the constant speed control motor 440 which is selected depending on the expected wind or water flow rate. In this embodiment, control input power is taken from the grid 445.

FIG. 12 shows another example 1200 of a combination harnessing module 410 and a controlling and generating module 480 connected to a Hummingbird 430 designed, for example, for operation in a river turbine where the density and power generating capability of a river is far greater than that of a wind turbine. In this example embodiment, the same multiplication or amplification factor of 10 (ten) will increase a constant power output of 8 (eight) megawatts to 80 (eighty) megawatts and provide sufficient baseload power output 455 for a village or city. The arrow points from the constant speed control motor 440 powered by the grid 445 to the output 455 and assumes a multiplication factor of ten. If the constant speed control motor 440 is rated at 8 (eight) megawatts, the turbine generates 80 (eighty) megawatts (amplified by a power of ten). It is assumed that the 8 (eight) megawatts of power for running the constant speed control motor comes from electric grid 445 but is returned to the grid at a value of 80 (eighty) megawatts for a net gain of seventy-two megawatts, and the harnessing module 410 is expected to deliver more than eighty megawatts due to river (or wind) speed.

FIG. 13(A) introduces the concept of a brushless direct current generator 1300 having no commutator which shows a cross-section having a shaft 1310 at the center (coming out from the page). Tied to the shaft 1310 is a rotor comprising a plurality of permanent magnets 1320-1 to 1320-N shown having North and South polarity. While the south pole is shown closest the shaft 1310, in alternative embodiments, the North pole may be closest the shaft 1310. The N/S permanent magnet pairs of the rotor may form a plurality of, for example, eight permanent magnet pairs of the rotor (more than four permanent magnet pairs up to, for example, a practical number may be used such as eight); however, any number of permanent magnet pairs may be used and are paired with electric wire coils of a stator 1330 which pick up electromotive force (EMF) generated by the spinning rotor spinning magnetic field. A loop of coil conductor is wound in such a way that when the permanent magnet pairs of the rotor are rotating, the rotating magnets cut the coil and EMF will be produced. Direct current is generated in one step, directly. The coils provide the generated direct current according to Faraday's law except, in this case, with the same polarity rather than alternating polarities (alternating current). There are no commutators or brushes needed to change AC to DC to wear out and the brushes will not cause the coils to short. There is no need for a rectifier bridge to smooth the direct current output as in a Faraday generator. As seen in FIG. 13(B), the circuit diagram for FIG. 13(A) is shown whereby a direct current voltage (VDC) is output by the electromotive force (EMF) generated by the coils 1330. A reciprocating magnetic field may generate alternating current (VAC) as the shaft 1310 reciprocates as the rotor of permanent magnet pairs 1320-1 through 1320-N turns.

FIGS. 14-20 all show examples where no electric grid is available to power a constant speed control motor (controlling module). In one embodiment, a diesel generator or fuel-powered generator may be used and no grid power used. However, to preserve the environment from carbon emissions, alternative constant power generation is discussed below.

FIG. 14 shows a general example of a distributed power system 1400 where there is no electric grid to draw power from. The constant speed control motor (controlling module) may be a DC control motor 440 receiving power from charge controller 1470 and batteries 1480 as back-up which taps DC from a DC generator 1450, for example, per the brushless DC generator of FIGS. 13A and 13B, driven by an extension of the variable input 421 (extended shaft of magnetic gear Hummingbird) of the simplified Hummingbird 430 which receives its rotational velocity from the harnessing module 410. A constant speed AC generator 450 may deliver power at a desired frequency to an Output 455 at a multiple of the locally generated power for powering the constant speed DC control motor 440.

FIG. 15 provides a more specific embodiment of the distributed power system 1500 of the embodiment of FIG. 14 where the charge controller 1570 may provide 0.8 megawatts of power backed-up by the battery 1580 and generated by a brushless DC generator 1560 as in FIG. 14 operating off the variable input 421 (extended shaft from magnetic gear 420) from the Hummingbird 430 and harnessing module 410. The arrows are intended to show that, if the turbine is generating 8 (eight) megawatts of power, the charge controller 1570 and control motor 440 are each rated at only a fraction, or 0.8 megawatts (assuming a multiplier or amplification of ten).

FIG. 16 shows a similar embodiment 1600 to that of FIG. 15 with the exception that the DC generator 1660 is capable of generating 8 (eight) megawatts of DC power to control motor 440 which is multiplied by ten times, for example, due to water flow power to provide 80 (eighty) megawatts of output power at output 455. So, if the charge controller 1670 and the control motor 440 are each rated at 8 (eight) megawatts, 80 (eighty) megawatts are output at output 455 from constant speed AC generator 450 (according to the experimentally determined multiplier of ten).

FIG. 17 shows a further example of a harnessing module 410 working with a controlling and generating module wherein the C&G module comprises a variable speed AC generator operating at 8 (eight) megawatts and couples to a known power converter for converting AC to DC (invert DC to AC in the alternative) to run AC (or DC) control motor 1740 rated at 8 (eight) megawatts. This embodiment, assuming a multiplier of ten, generates 80 (eighty) megawatts at output 455 in the absence of using grid power.

FIG. 18 is the first figure to show how power may be generated by series coupling of power converters and variable speed generators, all driven by variable input 421 (an extension shaft) from the harnessing module 410 (propeller shown) and gearbox 420 through the Hummingbird 430 and the controlling module and the generating module. In this example, two or more pairs of variable speed generators 1860-1, 1860-2 and known power converters 1870-1, 1870-2 (each rated, for example, at 8 (eight) megawatts) are used to, for example, generate, rather than just 8 (eight) megawatts but double (or triple or a higher multiple) of constant power depending on the drain this might cause on the harnessing module via variable input 421 (extension shaft). For example, with 16 (sixteen) megawatts input (from the series connected power converters), to a constant speed AC control motor 1740 rated at 16 (sixteen) megawatts 160 (one hundred sixty) megawatts of power are output at output 455. 240 (Two hundred forty) megawatts could be generated from three series-connected generator/power converter units (not shown). A problem is that the variable input 421 (extended shaft) will slow due to the drag caused on the harnessing module 410. Up to N generator 1860-1, 1860-2/converter 1870-1, 1870-2 pairs may be series-connected to generate a multiple of N times the power for operating a control motor 1740. Theoretically in high winds or great river flow, there would be little drag and running two or three or more generator/power converters is possible. Constant speed control motor 1740 is AC in FIG. 17 and in FIG. 18 and rated at 16 (sixteen) megawatts with two generator/converter pairs 1860-1, 1870-1 and 1860-2, 1870-2 in series. This concept is, with or without Hummingbird, also good for increasing the power rating of the currently used wind turbines or MHK turbines in development as long as the input energy can be harnessed by harnessing module 410.

In FIG. 19, constant speed control motor 440 may be DC powered and be driven by a power converter (modified to convert variable AC to DC without inverting back to AC) and variable speed generator 1960 at an 8 (eight) MW rating via variable input 421 (extension shaft) from the harnessing module 410 (propeller shown) and gearbox 420. Here, the harnessing module is rated at about eighty megawatts. With a laboratory demonstrated multiplication of ten, the 8 (eight) megawatts of the DC control motor 440 becomes 80 (eighty) megawatts of electricity at the output 455.

FIG. 20 shows how the AC generator 450 may generate at least 160 (one hundred sixty) megawatts of AC power at output 455 by increasing the number of power converters and variable speed generators from one to two (to three or more) where the DC control motor may have a rating of 16 sixteen (or twenty-four or more) megawatts when each power converter (converting AC to DC) and generator pair of two pairs is rated at 8 (eight) megawatts.

FIGS. 21-22 demonstrate how the principles of usage of a CG&H Module (controlling module, generating module and a Hummingbird) may be extended to an infinitely variable transmission for a vehicle.

Referring to FIG. 21, a pedal 2140 is depressed actuating a speed/torque control 2150 which actuates a DC control motor 440 powered by a battery backed-up charge controller 2125 and DC generator 2120 driven by a gearbox 420 (as found in a harnessing module 410) driven by an engine 2110. Variable input 421 (extension shaft) from the engine 2110 through the gearbox 420 and DC generator 2120 generate output power to a simplified Hummingbird 430 for outputting power 2150 to drive the wheels of a vehicle via output shaft 451. Control motor shaft 441 (DC control input) to Hummingbird 430 is controlled by (DC control motor 440) while DC generator 2120 passes variable input 421 (shaft) provides output power 2150 to drive wheels via output shaft 451.

Referring now to FIG. 22, there is shown an example 2200 of an infinitely variable transmission (IVT) for an electric vehicle. Pedal 2140 is shown actuating speed/torque control 2235. Battery 2230 is fed through speed/torque control 2235 to motor 2210 which operates gearbox 420. The DC control motor 440 provides a control input by control motor shaft 441 to Hummingbird 430; the input to the harnessing module 410 comes from the motor 2210 and is passed through gearbox 420; and infinitely variable revolutions per minute are output via variable input (shaft) 421 for driving wheels 2250 of an electric vehicle via output shaft 451.

FIG. 23 demonstrates how the principles of usage of a C&G Module (controlling and generating module) may be extended to a pump or a compressor. In this exemplary embodiment, alternating current (AC) 2305 is provided and a thermostat 2370 are input to a speed control 2335 which has an input to a control motor 440. The AC power 2305 also powers the motor 2310 for turning a pump or compressor variable input 421 (extension shaft) and the control input comes from control motor shaft 441 of control motor 440. The output 2350 to the pump/compressor is provided by output shaft 451 of Hummingbird 430.

Figure 8A:
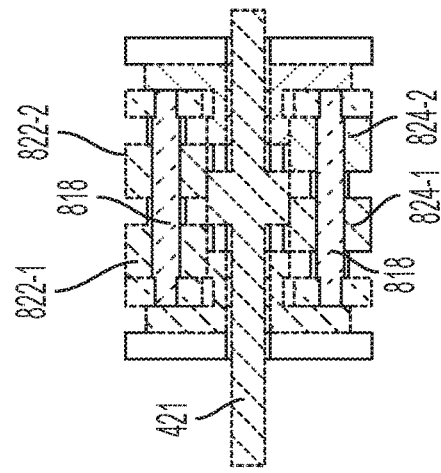
FIGS. 8A through 8E shows simplification of a Hummingbird speed converter in steps FIGS. 8A through 8E.

The principles of application of a harnessing module, a controlling module, generating module, and a Hummingbird assembly, for example, comprising left and right Transgears and a constant output motor may be used for multiplying the power input to a generator without resort to mechanical gear boxes and electronics which may be a cause of turbine failure, and their potential application in vehicle transmissions, pumps and compressors is also described. It will be assumed that either a wind turbine or an MHK turbine will now be further described in the detailed description of the drawings which follows while other applications are described in FIGS. 21-23.

DETAILED DESCRIPTION

In the figures of the present embodiments of the invention, an effort has been made to follow a convention such that the first reference number such as 1XX indicates figure number, for example, FIG. 1, where the first element first appears, and the XX, for example, Hatch 102 represent the element number XX (in this case 02) where the hatch first appears (in FIG. 1). Also in the following Detailed Description, a variable overlap generator (VOG) surrounding a shaft is introduced in FIG. 3 that may be useful in all embodiments described in the present application for controlling torque, rotational speed or power from a maximum overlap of a rotor or stator of the shaft such as the output shaft 451 of FIG. 4 to a generator 450.

Referring now to FIG. 1, FIG. 1 provides a corresponding perspective view of an exemplary MHK turbine 100, for example, located so as to receive water flow 110 from the left and shows a shaft and arrow 105 pointing towards a generator to generate electricity. The MHK turbine 100 may have a sloped block 101 (shown in FIG. 1) for channeling the water flow toward a hatch 102 which is shown in an almost open position with respect to a waterwheel 103. The waterwheel 103 will turn more freely if the hatch 102 is open and exposes the waterwheel 103 to the entire water flow 110. The hatch 102 may have an associated hatch control for hatch 102 for protecting the waterwheel 103 from damage as described in pending patent applications and issued patents and generator control wherein a waterwheel 103 is turned by water flow 110 in proportion to velocity (more water flow, higher waterwheel rotational speed in rpm for turning a generator). The hatch control may open/close the hatch 102 to a number of positions over the waterwheel 103 so that maximum or appropriate water flow 110 will drive the waterwheel 103, and a shaft and arrow 105 pointing to a generator (not shown) driven by a gearbox and magnetic gears (mechanical controls) 104 produces output power (variable rotational speed) to generate a desired constant frequency to a power grid (not shown) regardless of input water flow 110 rates. The output shaft and arrow 105 or any shaft coupled to the waterwheel 103 may comprise the VTG/VPG or VT&PG or VOG (briefly described below with respect to FIGS. 3 and 4).

The variable torque and power generator (VT&PG) or variable overlap generator (VOG) of FIG. 3 has one of an axially moveable rotor 302 and stator 303 with respect to its stationary or moveable counterpart stator or rotor so as to vary the amount of overlap by the stator/rotor with respect to the rotor/stator from a minimum when the stator 303 is displaced from the rotor 304 to a maximum value when the stator and rotor are proximate to or completely overlap one another.

FIG. 1 provides a better view of how an MHK river turbine may be placed bottom-mounted at the bottom of a river or stream or on the ocean floor or platform to receive ocean current. As shown in recently allowed patent application, a run-of-river turbine also known as an MHK river turbine is described in priority U.S. patent application Ser. No. 14/255,377 of Kyung Soo Han filed Apr. 17, 2014, now allowed. The MHK river turbine 100 may be allowed to rotate with tidal flow so as to always face the direction of tidal flow (see, for example, FIG. 14A, FIG. 14B or FIGS. 15A and 15B of the '377 application). A ramp called ramp block 101 receives water flow, and the water flow may be channeled over a horizontal plane to hatch 102 shown in a mostly open position to allow the water flow to turn waterwheel 103. A gear box and controls 104 (which may comprise a special purpose programmed controlled processor) regulates the variable rotational velocity of waterwheel 103 to a desired constant rotational velocity of output shaft 105 for driving an electric generator for feeding power to an electric power grid (not shown).

Referring to FIGS. 2A and 2B, FIGS. 2A and 2B provide a cut-away view of an embodiment of a rotational speed increasing/decreasing module 200 where a high speed magnetic rotor (wind or river driver) 210 may receive wind flow from a propeller for wind or a waterwheel for a river turbine (not shown) similar to the embodiment of FIG. 1 mounted, for example, to a river bed platform. FIG. 1 shows a gear box 104 which should be designed with an input to output rotational gear ratio to match the expected rotational velocity of a propeller or waterwheel to that desired as an output for driving the input of a Hummingbird assembly (see Hummingbird 430, FIG. 4). Per FIG. 2A first magnet array and FIG. 2B second magnet array, the gear box 104, preferably using magnetic gears, is preferably constructed of magnetic gears available, for example, from Magnomatics, Sheffield, UK. The gear box or magnetic gear arrays may also contain a known optional flywheel (not shown) to help regulate the speed of the output in relation to the rotational velocity felt at the input to the magnetic gear box, the magnetic gears protecting the gear box 104, 200 from failure. An optional flywheel may also help conserve kinetic energy received from the wind or river and help maintain a relatively constant speed. First and second magnet arrays of FIGS. 2A and 2B comprise high speed magnet rotors 210, steel pole piece rotors 220 and outer magnet array 230. Normally, the magnet arrays adhere to one another. In periods of high wind or water flow, the magnet arrays may slip until the rotational speed decreases so that the magnet arrays may catch and adhere to one another.

Referring now to FIG. 3, a variable torque/power generator (VT&PG) (VTG, VPG or VOG) 300 useful in all embodiments described in the present patent application for controlling torque/rpm or power or both of a generator shaft or motor shaft 301 from a maximum overlap to a minimum overlap of rotor 302 and stator 303 is shown in perspective view in FIG. 3. The utilization of a variable overlap generator (or motor) as shown in FIG. 3 has been validated by the University of Maryland, Baltimore County, as a useful control device for controlling output shaft 301 rotational velocity at a constant value with respect to a variable input 421 (shaft) rotational velocity from a gearbox 420 connected to a harnessing module 410 (see FIG. 4). For steady flowing streams and rivers, without much flow rate variation, a constant speed output can be easily produced by compensating the input. In wind turbine applications, considerably more control is required due to the more extreme variation in wind velocity from practically a calm wind to a high velocity storm wind. As shown in FIG. 3, a constant speed, variable overlap generator (VOG) 300 (VTG, VT&PG, or VPG), may comprise generator shaft motor shaft 301 (rotor shaft) on which may be displaced a moveable rotor 302 to positions of minimum overlap (shown with rotor 302 displaced from the stator 303) and maximum overlap where the rotor 302 is contained within the stator having been moved axially to the maximum overlap position. (There may be a number of positions between minimum overlap and maximum overlap but only the displaced minimum position is shown by way of example). Rotor (generator or motor) shaft 301 and rotor 302 may be connected to a pump, variable transformer, engine, generator or other device or wind or river/tidal/ocean wave/ocean current (MHK) turbine. When FIG. 4 is discussed, the VOG 300 may be located as an output from the Hummingbird 430 yet to be described. Note that in an alternative embodiment, a stator 303 may be moveable with respect to the rotor if needed to achieve minimum, medium and maximum torque. These variable overlap generators (VOG's) may be added to an input compensating IVMC (Infinitely Variable Motion Converter) with a speed converter, for example, to output electric power to a grid at constant frequency.

In MHK turbines, for example, the VT&PG may be used to advantage regulating output shaft rotational velocity to a constant value. Per FIG. 4, an output shaft 451 may have its output rotational velocity monitored by, for example, a tachometer or other rotational speed detector as an integral part of a control box and used to regulate the VT&PG.

Referring to FIG. 4, FIG. 4 provides a cut-away general layout of a river turbine 400 (overview) having a basic harnessing module 410 showing, in this case, a waterwheel 103 for collecting water flow 110 velocity and kinetic energy and turning an input shaft 418 to a gearbox 420. The gearbox 420 of preferably magnetic gears provides a variable input 421 (input shaft) of Hummingbird 430. A control motor 440 and control shaft 441 have a shaft gear 442 to provide the control input to the left sun disc, sleeve and gear 443 of left Transgear assembly 414 of the Hummingbird 430. The right Transgear 413 (carrier) and left Transgear 414 (carrier) are connected at the top by a connecting gear 415 to a variable overlap generator (VOG) 450 and at the bottom to generator shaft 451 to generating module 470 comprising generator 450 and its electrical output to grid 455. A controlling and a generating module 470 (C&G module) comprises controlling module, generating module 470 and control (control motor 440, shaft 441 and gear 442). The VOG generator 450 regulates the output on shaft 451 via shaft gear 452 meshed with sun disc/sleeve/sun gear 453 of the right Transgear 413 of the Hummingbird 430 which may generate output to grid 455 (electricity) or be used to control speed of an electric motor, be a pump or compressor driver or be a vehicle transmission, among other uses which will become apparent to one of ordinary skill.

FIGS. 5 and 6 together provide a left Transgear 414 and a right Transgear 413 of a Hummingbird and demonstrate a Transgear rule as to an input variable, control variable and an output variable when formed as a Hummingbird. As will be demonstrated, there may be many forms of Hummingbird embodiments and FIGS. 5 and 6 form but one example.

FIG. 5 shows a left Transgear 414 of a Hummingbird 500. The variable input 421, for example, comes from a harnessing module through a magnetic gearbox and is felt as a rotational velocity for turning variable input (shaft) 421 having a first sun gear 515. A control input 520 is delivered to sun disc, sleeve and gear assembly shown at the left of left Transgear 414 including carrier assembly surrounding variable input (shaft) 421 but may be at the right of the Transgear 414 in an alternative embodiment. The output to the right Transgear is the carrier assembly 530 controlled by control input 520 (sun disc, sleeve and gear assembly) and the variable input 421 comes from the first sun gear 515 attached to or integral with variable input 421 (shaft). The first Transgear left carrier 414 is circled in a dark black box.

FIG. 6 shows the left Transgear 414 (not numbered in FIG. 6) and the right Transgear 413 of a Hummingbird embodiment 600 where the variable input 421 is provided to the second sun gear 615, also attached to or integral with the variable input 421 (shaft) from the harnessing module via variable input 421 (shaft). A connecting gear 415 couples with carrier 530 of the left Transgear and transfers the value as a control input 620 (carrier) of the right carrier 413 (Transgear). The output of the right Transgear is sun disc/sleeve/sun gear 630.

FIG. 7 provides an explanation of how variable input 421 can be converted to constant output 630 using the Transgear rule for a Hummingbird with two Transgears where the first sun gear 515 of left Transgear 414 and the second sun gear 615 of right Transgear 413 may be seen. The variable input (to shaft) 421 may be represented as X+Δ rpm where X rpm is a minimum rotational speed in rpm and A is a variable additional speed caused by variable water flow or wing flow above the minimum X. Control input 520 of −X rpm is delivered to the left sun disc, sleeve and gear assembly of left Transgear 414. The output (output #1) 530 of left Transgear 414 is the carrier assembly and the output speed (Output #1 530) is (X+A rpm) X=Δ rpm. The output speed 530 is transferred to the second Transgear through connecting gear 415. Connecting gear 415 connects carriers of the left (carrier 530) and right (carrier 620). Transgears 414, 413 and the input variable, control variables and output variable are shown as before but in a single Hummingbird diagram. The second Transgear 413 has a variable input 421 of X+A rpm through second sun gear 615 and control input 620+Δrpm (carrier) through the connecting gear 415. The Transgear rule is, when the control input 620 is the carrier, the output direction changes. The output 630 can be calculated by adding variable input 421 and control input 520, (X+Δrpm)+Δrpm is −X, a constant minimum rotational speed. The output (output #2) 630 becomes (X+Δrpm)+Δrpm=−X. The constant value component X of the variable input is rotating in the opposite direction from the minimum input X of variable input 421. Similar reference numerals are used in FIG. 7 to denote similar components such as sun gears, the input shaft, the control sleeve and gear assembly 520, the control input 620 to the right Transgear 413, the connecting gear 415 and the output 630 is X rpm.

Figure 8B:
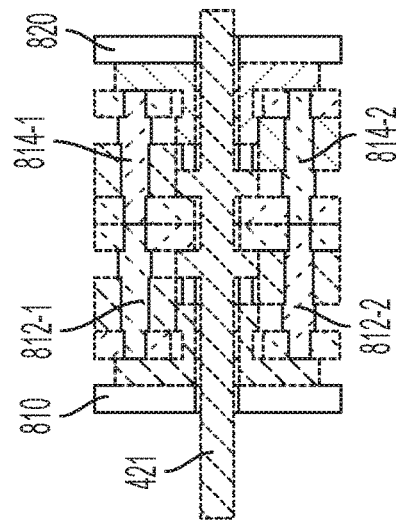
Figure 8C:
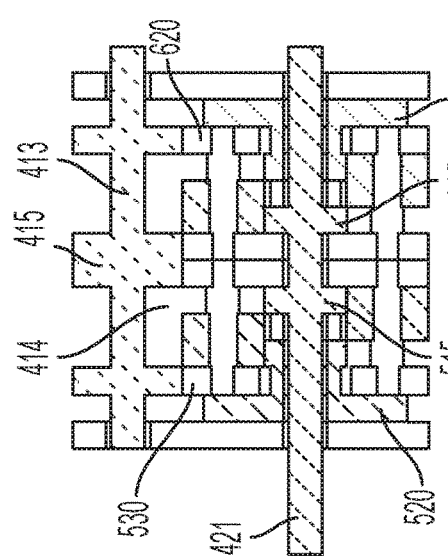
Figure 8D:
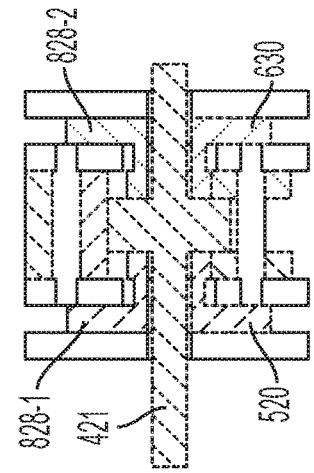
Figure 8E:
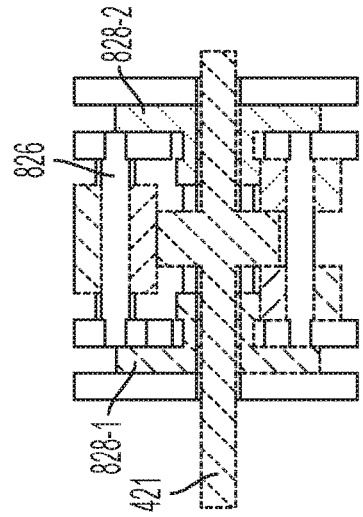
Figure 8F:
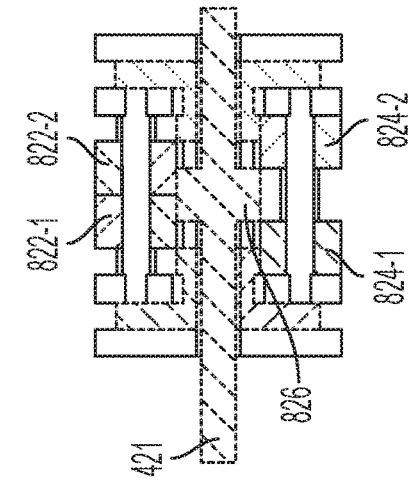
FIG. 8 comprising

Referring now to FIG. 8 comprising FIGS. 8A-8F, there are shown a plurality of steps of simplifying a two Transgear Hummingbird assembly in FIG. 8A similar to Hummingbird 700 shown in FIG. 7 to be a simplified Hummingbird in FIG. 8F. First referring to FIG. 8A, there is shown a left and right Transgear 414, 413 with a connecting gear 415 as shown in FIG. 7. The variable input 421 is a shaft having a first (left) sun gear 515 and a second (right) sun gear 615 attached to or integral with the variable input 421 (shaft). Control input 520 controls the variable input 421 and delivers the first output 530 (carrier) which outputs to the connecting gear 415. The connecting gear 415 inputs control input 620 (carrier) from left Transgear 414. The variable input 421 is still the input shaft through the second (right) sun gear 615 to right Transgear 413. The output 630 is still the sun disc, sleeve and gear assembly of right Transgear 413.

In FIG. 8B, there is a first step of simplification of lining up the connecting gear with attached carrier brackets 810, 820 so that there is no longer a need for the connecting gear 415. Solid line is used on FIGS. 8B-8F to show the changes from the preceding drawing such as the attachment of carrier brackets 810, 820. Solid lined carrier pins 812-1, 812-2 814-1, 814-2 remain separated. In FIG. 8C, the sun gears 515, 615 may be attached to one another as a single input and the carrier pins 818 no longer separated (formerly 812-1, 812-2, 814-1, 814-2) but elongated forming single pins 818 located opposite to one another. In FIG. 8D, the left and right planetary gears 824-1 and 824-2 are rotated 180 degrees from their position in FIG. 8C and shown separated from one another while planetary gears 822-1, 822-2 are moved together from FIG. 8C. In FIG. 8E, the single combined sun gear 826 in FIG. 8C is squeezed and enlarged in FIG. 8D and the two planetary gears 822-1 and 822-2 at the top are joined compared with FIG. 8D. FIG. 8F shows a further simplification of squeezing the sun disc, sleeve and sun gears 828-1, 828-2 such that their respective left and right sun gears are pushed in and the face of bottom planetary gears 824-1, 824-2 are thinner. In simplified FIG. 8F, variable input 421 is still the input shaft, the control input is the compressed carrier assembly between components 828-1 (520), 828-2 (630), left sun disc, sleeve and sun gear, and the output is the right sun disc, sleeve and sun gear 630. Some wind machines are asynchronous that operate slightly above synchronous speed. These do not require synchronization. Some wind machines are full-conversion DC machines. The generators produce DC which then goes through a DC to AC converter to become AC. (These also generally do not require synchronization.)

Referring now to FIG. 9, a known rotary frequency converter 900 is shown and may be utilized for converting one rotary frequency to another desired frequency which may be 50 Hz European, 60 Hz US or 400 Hz as are available and may be optionally provided by Hitzinger, a European corporation. Their web site for deliveries in the United States and a picture of a typical rotary frequency converter is http://hitzinger.us/converters.htm. For example, a control motor 910 may be a multiple of sixty revolutions per minute motor may output sixty Hertz via generator 920 to an electric grid. In an alternative embodiment, a multiple of four hundred revolutions per minute motor may output four hundred Hertz alternating current used in airplanes and ships. Rotary frequency converters 900 thus may convert variable rotational velocity to constant output electrical alternating current frequency when the speed is converted to a constant.

FIG. 10 provides an overall schematic and mechanical diagram of a wind or river turbine 1000: harnessing module 410 (shown as waterwheel 103) and C&G Module (controlling module and generating module 470). Controlling module consists of magnetic gearbox 420, simplified Hummingbird 430, and control motor 440. Controlling module comprises a constant speed control motor 440 operating at a rated constant power which may be AC or DC run by a constant source of DC or AC power 1045, variable input 421 (input shaft) rotating according to a gear ratio of the magnetic gear or gearbox 420 of the controlling module for increasing a slow wind speed or designed for a high water flow rate through a waterwheel 103 (propeller shown) to increase its rotational velocity. The harnessing module output is input to Hummingbird 430 via variable input 421 and shaft 451 having a gear meshed with a sun disc of right sun disc/sleeve/sun gear operates a generator 450 of generating module 470 which may provide power output 455 to an existing grid or power remote regions where no power is available as will be discussed herein. Any VOG or VT&PG is not specifically shown in this drawing but may comprise a component of generator 450 of generating module 470 for providing output 455 (electric power). A C&G module may function as a rotary frequency converter having a three variable Hummingbird 430 as a connector, and the Hummingbird is placed in between a constant speed control motor 440 and a constant speed generator 450. The third variable is used for the variable input power provided by shaft 411 from harnessing module 410 to gearbox 420. The power path is from the harnessing module 410 through gear box 420 to the generator 450 through simplified Hummingbird 430 controlled by control motor 440 and shaft 441. Shaft 441 has a gear that is meshed with the left sun disc of sun disc/sleeve/sun gear of the compressed carrier assembly (see FIG. 8F, gear 828-1) The constant speed control motor 440 is not in the power path. In general, a turbine system consists of two major modules, a harnessing module 410 and a C&G (controlling and generating) module. A controlling and generating (C&G) module in this case may consist of a magnetic gearbox 420, a simplified Hummingbird 430, a DC or AC control motor 440, and a generator 450. FIGS. 11, 12 and 14-20 show similar harnessing modules and simplified Hummingbirds as FIG. 10.

FIG. 11 shows an embodiment 1100 of a combination of a harnessing module 410 and a C&G Module 480. Power multiplying Hummingbird 430 for harnessing wind or marine hydrokinetic turbine multiplies power of a constant speed control motor 440 which may be powered by a grid 445 at, for example, 0.8 megawatts and actually generates 10 (ten) times as much power or 8 (eight) megawatts when boosted by wind or river power 8 MW from the harnessing module 410. The arrow is intended to emphasize that if the generator 450 is designed to generate 8 (eight) megawatts, the control motor 440 is rated at 0.8 MW. In prior art turbines, power conversion is limited (the largest known power converter is 8 mega Watts), having two variables, output power cannot be increased, and a cut-off frequency or speed determined so as to not damage the power converter. In the present invention, the amount of output power is virtually unlimited by the wind input speed to a propeller or the waterwheel river flow rate and by the rating of the constant speed control motor 440 which is selected depending on the expected wind or water flow rate.

FIG. 12 shows another example 1200 of a combination harnessing module 410 and a C&G module. Generating module is designed, for example, for operation in a river as a river turbine where the density and power generating capability of a river is far greater than that of a wind turbine or as a propeller-driven wind turbine. In this example embodiment, the same multiplication factor of 10 (ten) will increase a constant power output of a constant speed generator 450 of 8 (eight) megawatts to 80 (eighty) megawatts at output 455 and provide sufficient power for a village or small city. The arrow points from the constant speed control motor 440 to the output 455 and assumes a multiplication factor of 10 (ten). If the constant speed control motor 440 is rated at 8 (eight) megawatts, the turbine may generate 80 (eighty) megawatts (or more depending on the amplification). It is assumed that the 8 (eight) megawatts of power for running the constant speed control motor 440 comes from an electric grid 445 but is returned to the grid at a value of 80 (eighty) megawatts for a net gain of 72 (seventy-two) megawatts and the harnessing module 410 is expected to deliver 80 (eighty) megawatts due to river or wind speed driving the magnetic gearbox 420.

FIG. 13(A) is a top view and introduces the concept of a brushless direct current (DC) generator 1300 having no commutator. FIG. 13A shows a cross-section having a shaft 1310 at the center (coming out from the page). Tied to the shaft 1310 is a rotor comprising a plurality of permanent magnet pairs 1320-1, 1320-2, 1320-3 . . . 1320-N shown having North and South polarity. While the south pole is shown closest the shaft 1310, in alternative embodiments, the North pole may be closest the shaft 1310. The N/S permanent magnet pairs of the rotor may form a plurality of, for example, six permanent magnets of the rotor (more than four permanent magnets up to, for example, a practical number may be used such as eight; N being shown as an integer and practical number); however, any number N of permanent magnet pairs may be used and are paired with electric wire coils of a stator 1330 which pick up electromotive force (EMF) generated by the spinning rotor 1320-1 through 1320-N. A loop of coil conductor is wound in such a way that when the permanent magnets of the rotor are rotating, the rotating magnet pairs of the rotor cut the coil 1330 of the stator and EMF will be produced. Direct current (VDC) is generated in one step, directly. The coils 1330 provide the generated direct current according to Faraday's law except, in this case, with the same polarity rather than alternating polarities (alternating current). There are no commutators or brushes needed to wear out and the brushes will not cause the coils 1330 to short. There is no need for a rectifier bridge to smooth the direct current output as in the prior art DC generator. As seen in FIG. 13(B), the circuit diagram for FIG. 13(A) is shown whereby a direct current voltage (VDC) is directly output by the electromotive force (EMF) generated by the coils 1330. EMF or DC may be generated directly as the shaft 1310 turns the rotor of permanent magnet pairs 1320-1 . . . 1320-N which turn within stator coil 1330.

FIGS. 14-20 all show examples where electric grid is not available to power a constant speed control motor of a controlling module. In one embodiment, a diesel generator or fuel-powered generator may be used and no grid power used. Other embodiments using no grid power are described below such that the harnessing module and C&G (controlling and generating) module generate enough power to output power to a remote village having no grid power.

FIG. 14 shows a general example 1400 of a distributed (or stand-alone) power system where there is no electric grid to draw power from. The constant speed control motor may be a DC control motor 440 receiving power from batteries 1480 as a back-up to a known charge controller 1470 (on the battery) which taps DC from a DC generator 1460, for example, per the brushless DC generator of FIGS. 13A and 13B, driven by an extension of the variable input 421 (extended shaft of the magnetic gear Hummingbird) of the simplified Hummingbird 430 which receives its rotational velocity from the harnessing module 410 through a magnetic gearbox 420 and optional flywheel. A constant speed DC generator 1460 may deliver power to an Output 455 at a multiple of the locally generated power for powering the constant speed DC control motor 440. Note that all power for operating the DC control motor 440 is taken from the wind or the water (renewables) and not from carbon pollutants such as oil or gas or diesel generators.

FIG. 15 provides a more specific embodiment of a distributed power system 1500 of the embodiment 1400 of FIG. 14 where the charge controller 1570 may provide 0.8 megawatts of power backed-up by the battery 1580 and generated by a brushless DC generator 1560 as in FIG. 14 operating off the variable input 421 (extended shaft) from the simplified Hummingbird 430 and the harnessing module 410 preferably having a magnetic gear or gearbox 420. The arrows are intended to show that, if the turbine is generating 8 (eight) megawatts of power, the charge controller 1570 and DC control motor 440 are each rated at only a fraction, or 0.8 megawatts of power.

FIG. 16 shows a similar embodiment 1600 of a distributed power system to that of FIG. 15 with the exception that the DC generator 1670 is capable of generating 8 (eight) megawatts of DC power which is multiplied by ten times, for example, due to water flow power from harnessing module 410 to provide 80 (eighty) megawatts of output power at output 455. So if the charge controller 1670 backed-up by battery 1680 and the control motor 440 are each rated at 8 (eight) megawatts, 80 (eighty) megawatts are output from constant speed AC generator 450 at output 455 (according to the experimentally determined multiplier of ten).

FIG. 17 shows a further example 1700 of a distributed power system of a harnessing module 410 working with a C&G module including simplified Hummingbird 430 where C&G (controlling and generating) module comprise a variable speed AC generator 1760 operating at 8 (eight) megawatts from variable input 421 (extension shaft) and couples to a known power converter 1770 for converting AC to DC (invert DC back to AC in the alternative) to run AC (or DC) control motor 1740 rated at 8 (eight) megawatts. This embodiment, assuming a multiplier of ten, generates 80 (eighty) megawatts at output 455 of constant speed generator 450 in the absence of using grid power.

FIG. 18 is another figure of a distributed power system 1800 and is the first figure to show how power may be generated by series coupling of power converters 1870-1, 1870-2 . . . and variable speed generators 1860-1, 1860-2 . . . all driven by variable input 421 (an extension shaft) from the harnessing module 410 and gearbox 420 through the simplified Hummingbird 430 of the C&G module. In this example, two or more pairs of variable speed generators 1860-1, 1860-2 and power converters 1870-1, 1870-2 (each rated, for example, at 8 (eight) megawatts, or other value such as 4 (four) megawatts to provide 8 (eight) megawatts with a first eight megawatt pair) are used to, for example, generate, rather than just 80 (eighty) megawatts at an output of a constant speed AC generator 450 but double (or triple or a higher multiple) of power depending on the drain this might cause on the harnessing module 410 via variable input 421 (extension shaft). For example, with 16 (sixteen) megawatts input (from two series connected power converters 1870-1, 1870-2), 160 (one hundred sixty) megawatts of power may be generated by AC generator 450 and output at output 455 (showing 80 MW for just one power converter). Two hundred forty (240) megawatts could be generated from three series-connected power converter/generator pairs of units. A problem is that the variable input 421 (shaft) will slow due to the drag caused on the harnessing module 410. But theoretically in high winds or great river flow, there would be little drag and running two or three or more power converters/variable speed converters is possible. Constant speed motor 1740 is AC and rated at 16 MW for generator/converter pairs 1860-1, 1860-2, 1870-1 and 1870-2 shown in FIG. 18.

In FIG. 19, yet another distributed power system 1900, this one using a modified power converter 1970 that converts AC to DC is shown. A constant speed control motor 440 rated at 8 MW may be DC and be driven by a modified power converter 1970 that converts AC to DC (not inverting DC back to AC) and variable speed generator 1960 at an 8 (eight) MW rating received input rotations speed via variable input 421 (extension shaft). Here, the harnessing module 410 is likewise rated at about 80 (eighty) megawatts minimum. With a laboratory demonstrated multiplication of ten, the 8 (eight) megawatts of the DC control motor 440 becomes 80 (eighty) megawatts of electricity at the output 455 from constant speed AC generator 450.

FIG. 20 shows another distributed power system 2000 and how the AC generator 450 may generate at least 160 (one hundred sixty) megawatts of AC power at output 455 by increasing the number of modified power converters 2075-1, 2075-2 and variable speed generators 2060-1, 2060-2 from one to two (to three or more) (each rated at 8 (eight) megawatts) where the DC control motor 440 has a rating of 16 (sixteen) megawatts (two times eight if two converter/generators are used) when each modified power converter 2075-1 and 2075-2 (converting AC to DC) and generator pair 2060-1 and 2060-2 of two converter/generator pairs is rated at 8 (eight) megawatts and are used to deliver sixteen MW to constant speed DC control motor 440.

FIGS. 21-22 demonstrate how the principles of usage of a C&G module may be extended to an infinitely variable transmission for a vehicle and in an electric vehicle with a battery (such as a Tesla of Elan Musk).

Referring to FIG. 21, an infinitely variable transmission (IVT) is shown driven by engine 2110. A pedal 2140 is depressed actuating a speed/torque control 2150 which actuates a DC control motor 440 powered by a battery 2130 backed-up charge controller 2125 and DC generator 2120 driven by a magnetic gearbox 420 (as found in a harnessing module) driven by an engine 2110. Charge controller 2125 and speed torque controller 2150 are backed up by battery 2130. Extension shaft 421 from the engine 2110 through the magnetic gearbox 420 and DC generator 2120 generate output power to a Hummingbird 430 for outputting power to drive the wheels of a vehicle via output shaft 2150 of the Hummingbird 430. As before, engine input 2110 is controlled by the output of speed torque control 2150 to provide variable rotational speed to gearbox 420 and provides variable input 421 which outputs variable rotational speed to run DC generator 2120 and the engine 2110 may be analogous to a harnessing module 410. Variable input 421 (shaft) outputs power 2150 to drive wheels via shaft 451 from simplified Hummingbird 430.

Referring now to FIG. 22, there is shown a further example 2200 of an infinitely variable transmission (IVT) for an electric vehicle. Pedal 2140 is shown actuating speed/torque control 2235. Battery 2230 provides DC power and is fed through speed/torque control 2235 and to motor 2210 which operates magnetic gearbox 420. The DC control motor 440 provides a control input to simplified Hummingbird 430 via shaft 441 of DC control motor 440. The input to simplified Hummingbird 430 comes via variable input 421 (extension shaft) from the motor 2210 and magnetic gearbox 420 and infinitely variable revolutions per minute are output 2250 via output shaft 451 of simplified Hummingbird 430 for driving wheels of an electric vehicle.

FIG. 23 shows a combination pump and compressor controlling and generating (C&G) module 2300 and demonstrates how the principles of usage of a C&G module may be extended to an infinitely variable pump (IVP) or a compressor (IVC). In this exemplary embodiment, alternating current 2305 is provided and a thermostat 2370 are input control to a speed control 2335 which has an electrical AC input 2305 to a control motor 440. The AC power 2305 also powers the motor 2310 analogous to a harnessing module 410 for turning a pump or compressor input shaft 451 and the control input comes from control motor shaft 441 from control motor 440. Variable input 421 (shaft) outputs variable rotational speed to simplified Hummingbird 430. The output to the pump/compressor is provided by shaft 451 meshed with the output sun disc/sleeve/sun gear of simplified Hummingbird 430 as output to a pump or a compressor. It is important to note that the output can vary from zero to designed maximum rpm. The principles of application of a harnessing module and a C&G module (a controlling module and a generating module,) comprising a Hummingbird assembly, for example, comprising left and right Transgears may be used for multiplying the power input to a generator without resort to mechanical gear boxes and electronics which may be a cause of turbine failure, and their potential application in vehicle transmissions, pumps and compressors is also described. It will be assumed that either a wind turbine or an MHK turbine are described in the detailed description of the drawings while other applications are described in FIGS. 21-23. While river turbines are suggested, Hummingbirds and control motors and VT&PG's may also be used in wave and tidal turbines.

Four (4) independent concepts are described herein, but they are all related to variable overlap of rotor and stator assemblies and the application of these in a variable torque/power generator (VTG/VPG). The four independent concepts described herein comprise: (a) Extension of the VPG concept to motors (VPM): the extension comprising adjustment of the relative axial overlap between the rotor and stator to control speed and torque in, for example, a vehicle engine output independently. The VPG extension may seem to be a good application for electric vehicles (EV's) (in electrical power generators used with the motors and the motors themselves): Elon Musk of Tesla or other manufacturers of electric vehicles using constant sources of power such as battery power may appreciate this suggestion of the use of variable output power generators and Hummingbirds. An internal combustion engine (actually a plurality of engine embodiments) in which the present concept may be applied to advantage is disclosed in pending U.S. application Ser. No. 14/225,658, filed Mar. 26, 2014, now allowed (and published as U. S. Published Patent Application 2014/0290616 on Oct. 2, 2014).

A second concept is for (b) mechanical synchronization between a rotor and a stator; discussed herein will be an adjustment of the relatively small angular relationship between the rotor and stator. This concept of rotating one moveable element in cross-section about the immoveable element (the stator) can be useful for synchronizing the lead/lag relationship between the rotor and stator in operation. For example, the regulation of an adjustment angle is useful for mechanical speed converters.

A third concept discussed herein is (c) providing a reciprocating input to a fixed/variable power generator generating electricity with a reciprocating rotor (not shown). This concept eliminates the need of Sprags from our speed converter, and reduces cost, weight, size, and potential validation time.

A fourth concept described herein is (d) Reactive VPG with respect to a waterwheel and generator used in wind or marine hydrokinetic (MHK) turbines VPG may control torque to the waterwheel in our river or wind turbine (or any variable load). A river turbine with a hatch is described in priority U.S. Pat. No. 8,485,933 and further embodiments of a river turbine with Hatch control are disclosed in pending U.S. application Ser. No. 14/225,658 filed Mar. 26, 2014, now allowed (and published as U. S. Published Patent Application 2014/02960616 on Oct. 2, 2014). A wind turbine and VTG are also described in U. S. Pat. No. 8, 388, 481 and WO 2011/011358 of Mr. Han. Reactive torque control may, for example, control waterwheel speed up to a designed maximum and then Hatch control may be used to control waterwheel speed.

The second concept (mechanical synchronization) is a cousin to VPG since the relative relationship between the rotor and stator are being adjusted except one is linearly (axially) and the other angularly (radially) (as seen in cross sectional view FIG. 8B).

Permanent Magnet Synchronous Generator (PMSG), Field excited synchronous generator (FESG) and the Induction Generator (IG) are three candidates for applications in turbines and with Hummingbirds. As permanent magnet excitation eliminates the excitation losses of a FESG, hence, PMSG will be a more favored option going forward. The direct drive, grid connected IG and PMSG generators are intended for fixed speed operations. When the PMSG generator is connected to the grid, the speed is determined by the grid frequency and is constant. So, if the torque to the generator is increased (sudden gust of wind), the generator will produce electromagnetic force to resist an increase in speed. Therefore, an excessive gust of wind leads to large stresses on the wind turbine's drive train. However, an induction generator (IG) allows a small change of speed with the change of torque going to the generator and lower stresses/tear and wear of the drive train. As the IG and the PMSG machine have a similar stator component, the material cost difference is mainly due to the rotor. The PM's cost is typically going to be more than that of aluminum, and one can see that the material cost of the induction generator is expected to be much lower than the PMSG generators for the same power rating. But PMSG generators have higher efficiency so the higher material cost may be somewhat compensated for the extra electricity generated. Also, an inductive power factor of the induction generators requires capacitors for power factor correction and may increase the overall cost of the IG. So, a trade-off analysis is needed for case-by-case basis before declaring any one machine best for an application or a given installation.

In any wind turbine embodiment, a shared characteristic is that the output generator requires regulation with respect to wind speed for synchronization of phase may be applied to control the wind turbine generator output via VT&PG by sensing the wind turbine propeller shaft speed and governing the torque and phase angle applied between generator rotor and stator.

The principles of application of the several discussed embodiments of a structure and method of constructing same for, for example, providing a green energy alternative to the burning of fuel such as coal, oil or other less environmentally friendly energy sources have been demonstrated above using a spur/helical gear assembly of sun gears and planetary gears and a VT&PG control assembly, for example, in a wind or MHK turbine electric power generator. The present embodiments used in conjunction with known flow energy turbine systems may be enhanced by using many known control systems for improved operation such as pitch and yaw control in wind turbines, control responsive to power grid statistics and requirements and remote or automatic control responsive to predicted and actual weather conditions (wind velocity from an anemometer, water flow velocity from a water flow velocity meter, barometric reading and direction (rising or falling) and the like). These and other features of embodiments and aspects of a variable flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. An electric power generator turbine for generating wind or marine hydrokinetic power comprising:

a harnessing module comprising one of a propeller and a waterwheel and a magnetic gearbox having a gear ratio related to expected one of wind speed and water flow rate;

a controlling module comprising a constant speed motor and a generating module comprising a generator, the harnessing and generating modules connected to the controlling module, the controlling module comprising single spur/helical gear assembly, the single spur helical assembly comprising an extension shaft comprising a single sun gear attached to or integral with the extension shaft, the extension shaft receiving a variable input rotational speed from the harnessing module, the variable input rotational speed comprising a minimum value of rotational speed X plus a variable component Δ related to an amount of renewable energy harnessed by the harnessing module in excess of the minimum value X, the single sun gear meshed with a first planetary gear of a carrier assembly comprising first and second oppositely located pins, the first planetary gear supported by the first oppositely located pin, the first planetary gear having a width wider than either one of the second and third oppositely located planetary gears, the second and third planetary gears supported by the second oppositely located pin, the second planetary gear being meshed with a sun disc of a first sun gear/sleeve/sun disc surrounding the extension shaft comprising a control input, a control motor of the controlling module having a shaft and a shaft gear, the shaft gear meshed with a sun disc of the first sun gear/sleeve/sun disc, the third planetary gear being meshed with a sun disc of the second sun gear/sleeve/sun disc surrounding the extension shaft comprising an output, the second sun disc of the second sun gear/sleeve/sun disc meshed with a shaft gear of a generator, the shaft gear and generator comprising the generating module, and the generating module for generating a multiple of a power rating of the control motor as electric power output of the second sun disc of the second sun gear/sleeve/sun disc located opposite the first sun gear/sleeve/extension disc.

2. The electric power generator turbine of claim 1 further comprising a variable torque and power generator for regulating the output power to an approximately constant value that is a multiple of the input power rating of the control motor of the controlling module.

3. The electric power generator turbine of claim 2 wherein the control motor of the controlling module is direct current, the direct current control motor receiving constant voltage direct current from a charge controller, the charge controller receiving direct current voltage from a direct current generator driven by the extension shaft providing the variable input rotational speed.

4. The electric power generator turbine of claim 3 wherein a multiplier of a constant power rating of the direct current control motor compared with the electric power output of the generator of the generator of the generating module is ten.

5. The electric power generator turbine of claim 3 wherein the electric power generator turbine comprising the direct current control motor is powered by the direct current generator connected to an extension shaft of the harnessing module via the single spur/helical gear assembly, the direct current generator generating direct current via a charge controller, and the charge controller and direct current control motor having a battery for back-up direct current power.

6. The electric power generator of claim 1 wherein the generator of the generating module is alternating current and comprises a variable overlap generator having a rotor connected to the extension shaft receiving the variable input rotational speed and a stator.

7. The electric power generator turbine of claim 1 wherein the control motor of the controlling module is powered by alternating current output by a power converter connected to an AC generator driven by the extension shaft receiving the variable input rotational speed.

8. The electric power generator turbine as recited in claim 1, the control motor of the controlling module comprises a direct current control motor, the direct current control motor receiving direct current voltage from a DC generator driven by the extension shaft receiving the variable input rotational speed and a charge controller.

9. The electric power generator turbine as recited in claim 1, the control motor of the controlling module comprises an alternating current control motor, the alternating current control motor receiving alternating current at constant frequency from a variable speed generator driven by the extension shaft receiving the variable input rotational speed and a power converter.

10. The electric power generator turbine as recited in claim 9 wherein the variable speed generator driven by the extension shaft receiving the variable input rotational speed and a power converter.

11. The electric power generator turbine as recited in claim 1, the single gear assembly further comprising first and second carrier brackets opposite one another and proximate to the first sun gear/sleeve/sun disc.

12. The electric power generator turbine as recited in claim 1, the single spur/helical gear assembly comprising a simplification of a first left and a second right spur/helical gear assembly.

* * * * *